United States Patent
Evans et al.

(10) Patent No.: US 10,104,334 B2
(45) Date of Patent: *Oct. 16, 2018

(54) CONTENT-ADAPTIVE ADJUSTMENT OF DISPLAY DEVICE BRIGHTNESS LEVELS WHEN RENDERING HIGH DYNAMIC RANGE CONTENT

(71) Applicant: Microsoft Technology Licensing, LLC, Redmond, WA (US)

(72) Inventors: Glenn F. Evans, Kirkland, WA (US); Mehmet Kucukgoz, Seattle, WA (US); Matthew Wozniak, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,522

(22) Filed: Jan. 27, 2017

(65) Prior Publication Data
US 2018/0220101 A1    Aug. 2, 2018

(51) Int. Cl.
*G06K 9/00* (2006.01)
*H04N 7/01* (2006.01)
(Continued)

(52) U.S. Cl.
CPC ........... *H04N 7/0117* (2013.01); *G06T 5/007* (2013.01); *G06T 5/40* (2013.01); *G09G 5/10* (2013.01);
(Continued)

(58) Field of Classification Search
CPC .... H04N 5/2354; H04N 5/225; H04N 5/2256; H04N 5/228; H04N 9/045; H04N 9/735;
(Continued)

(56) References Cited

U.S. PATENT DOCUMENTS 7,433,514 B2   10/2008   Sloan
7,492,375 B2    2/2009   Toyama et al.
(Continued)

FOREIGN PATENT DOCUMENTS

EP           3136375        3/2017
WO     WO 2012/125802       9/2012
(Continued)

OTHER PUBLICATIONS

"Adobe Photoshop CC Help," pp. 431-433 (document marked "last updated Jun. 19, 2016").
(Continued)

*Primary Examiner* — Aklilu Woldemariam
(74) *Attorney, Agent, or Firm* — Klarquist Sparkman, LLP

(57) ABSTRACT

Innovations in rendering of high dynamic range ("HDR") content are described. A playback system can dynamically and proactively adjust the brightness level of a target display device. In some cases, this can reduce power consumption when rendering HDR content, without any noticeable degradation in quality. For example, the playback system includes decision logic. The decision logic is configured to receive summary information for sample values of a picture of HDR content and determine (based at least in part on the summary information) a brightness level of the target display device. The playback system can send, to the target display device, a control signal that indicates the brightness level of the target display device. A tone mapper can be configured to apply tone mapping to input values for the sample values of the picture of HDR content, according to a tone mapping function, and thereby produce output values.

20 Claims, 21 Drawing Sheets

(51) Int. Cl.
*G09G 5/10* (2006.01)
*G06T 5/00* (2006.01)
*G06T 5/40* (2006.01)
*H04N 1/60* (2006.01)
*H04N 7/14* (2006.01)

(52) U.S. Cl.
CPC ............ *H04N 1/6027* (2013.01); *G06K 9/00* (2013.01); *G06T 2207/20208* (2013.01); *G09G 2320/0626* (2013.01); *H04N 7/147* (2013.01)

(58) Field of Classification Search
CPC ............ H04N 19/80; H04N 21/41407; H04N 21/4223; H04N 21/4302; H04N 5/23219; H04N 5/23229; H04N 5/23235; H04N 5/335; H04N 5/2355; H04N 19/46; H04N 19/172; H04N 19/513; H04N 19/11; H04N 19/14; H04N 19/147; H04N 5/20; H04N 5/2351; H04N 9/67; H04N 19/00157; H04N 19/105; H04N 19/154; H04N 19/162; H04N 19/177; H04N 19/54; H04N 19/597; H04N 5/02; H04N 5/232; H04N 5/23222; H04N 5/23245; H04N 5/3572; H04N 5/367; H04N 5/772; H04N 9/68; H04N 7/00; H04N 1/4072; H04N 1/6027; H04N 13/0239; H04N 13/0242; H04N 5/247; H04N 7/181; H04N 9/87; H04N 19/115; H04N 19/124; H04N 19/142; H04N 19/184; H04N 19/186; H04N 19/187; H04N 19/30; H04N 19/61; H04N 19/70; H04N 1/646; H04N 19/00981; H04N 19/98; G06T 2207/20208; G06T 5/50; G06T 5/009; G06T 5/007; G06T 5/008; G06T 7/254; G06T 5/40; G06T 7/20; G06T 2207/10016; G06T 2207/20008; G06T 2207/20012; G06T 2207/30176; G06T 5/001; G06T 7/90; G06T 15/50; G06T 2207/20021; G06T 3/4007; G06T 3/4023; G06T 5/00; G06T 3/4015; G06T 2200/21; G06T 2207/10024; G06T 11/001; G06T 9/004; G06K 9/00234; G06K 9/00771; G09G 2320/0271; G09G 2320/0606; G09G 2320/0613; G09G 2320/066; G09G 2320/0276; G09G 5/10; G09G 2320/0242; G09G 2320/0626; G09G 2320/0666; G09G 2320/08; G09G 2340/06; G09G 2360/02; G09G 2360/04; G08B 13/19608; G08B 13/19656; H04L 67/10; H04L 67/1097; G06F 3/1423; G06F 3/1462
USPC .................. 382/162, 168; 348/22, 231, 239; 345/589
See application file for complete search history.

(56) References Cited

U.S. PATENT DOCUMENTS

| | | | |
|---|---|---|---|
| 7,953,286 B2 * | 5/2011 | Chiang | G06T 5/009 |
| | | | 358/522 |
| 7,983,502 B2 | 7/2011 | Cohen et al. | |
| 8,014,445 B2 | 9/2011 | Segall et al. | |
| 8,218,625 B2 | 7/2012 | Ward et al. | |
| 8,248,486 B1 | 8/2012 | Ward et al. | |
| 8,330,768 B2 * | 12/2012 | Mantiuk | H04N 1/6027 |
| | | | 345/589 |
| 8,355,595 B2 | 1/2013 | Bressan | |
| 8,433,150 B2 | 4/2013 | Yuan et al. | |
| 8,606,009 B2 | 12/2013 | Sun | |
| 8,964,060 B2 | 2/2015 | Levoy et al. | |
| 9,064,313 B2 | 6/2015 | Seshadrinathan et al. | |
| 9,076,224 B1 * | 7/2015 | Shah | G06T 5/009 |
| 9,087,391 B2 | 7/2015 | Geiss et al. | |
| 9,406,112 B2 | 8/2016 | Banterle et al. | |
| 9,497,380 B1 | 11/2016 | Jannard et al. | |
| 9,576,555 B2 | 2/2017 | Ninan et al. | |
| 9,712,816 B2 * | 7/2017 | Garbas | H04N 19/14 |
| 9,741,099 B2 | 8/2017 | Lim et al. | |
| 2005/0104900 A1 | 5/2005 | Toyama et al. | |
| 2005/0117799 A1 | 6/2005 | Fuh et al. | |
| 2007/0035706 A1 | 2/2007 | Margulis | |
| 2007/0201560 A1 | 8/2007 | Segall et al. | |
| 2007/0269132 A1 | 11/2007 | Duan et al. | |
| 2008/0068472 A1 | 3/2008 | Zhou | |
| 2009/0167672 A1 * | 7/2009 | Kerofsky | G09G 3/3413 |
| | | | 345/102 |
| 2011/0095875 A1 | 4/2011 | Thyssen et al. | |
| 2011/0188744 A1 * | 8/2011 | Sun | G06T 5/50 |
| | | | 382/162 |
| 2011/0194618 A1 | 8/2011 | Gish et al. | |
| 2011/0255101 A1 | 10/2011 | Edge | |
| 2012/0057803 A1 | 3/2012 | Wakazono | |
| 2012/0081385 A1 | 4/2012 | Cote et al. | |
| 2012/0081566 A1 * | 4/2012 | Cote | H04N 5/2256 |
| | | | 348/222.1 |
| 2012/0081577 A1 | 4/2012 | Cote et al. | |
| 2012/0147593 A1 | 6/2012 | El-mahdy et al. | |
| 2012/0218442 A1 * | 8/2012 | Jandhyala | G06T 5/50 |
| | | | 348/239 |
| 2012/0314944 A1 | 12/2012 | Ninan et al. | |
| 2013/0038790 A1 | 2/2013 | Seetzen et al. | |
| 2013/0083838 A1 | 4/2013 | Touze et al. | |
| 2013/0120656 A1 | 5/2013 | Wilson et al. | |
| 2013/0241931 A1 | 9/2013 | Mai et al. | |
| 2014/0002694 A1 * | 1/2014 | Levy | G06T 5/50 |
| | | | 348/239 |
| 2014/0092012 A1 | 4/2014 | Seshadrinathan et al. | |
| 2014/0210847 A1 * | 7/2014 | Knibbeler | G09G 5/006 |
| | | | 345/589 |
| 2014/0229875 A1 | 8/2014 | Li et al. | |
| 2014/0241418 A1 * | 8/2014 | Garbas | H04N 19/00042 |
| | | | 375/240.02 |
| 2014/0368557 A1 | 12/2014 | Bastani | |
| 2015/0078661 A1 | 3/2015 | Granados et al. | |
| 2015/0117791 A1 | 4/2015 | Mertens | |
| 2015/0169204 A1 | 6/2015 | DeSelaers et al. | |
| 2015/0243200 A1 | 8/2015 | Pan | |
| 2015/0243243 A1 | 8/2015 | Greenebaum et al. | |
| 2015/0341611 A1 | 11/2015 | Oh et al. | |
| 2015/0350513 A1 | 12/2015 | Zhang et al. | |
| 2015/0358646 A1 | 12/2015 | Mertens | |
| 2016/0005349 A1 | 1/2016 | Atkins et al. | |
| 2016/0080716 A1 | 3/2016 | Atkins et al. | |
| 2016/0125580 A1 | 5/2016 | He | |
| 2016/0134853 A1 | 5/2016 | Gish et al. | |
| 2016/0241829 A1 | 8/2016 | Qu et al. | |
| 2016/0248939 A1 | 8/2016 | Thurston, III et al. | |
| 2016/0255356 A1 | 9/2016 | Strom et al. | |
| 2016/0269676 A1 | 9/2016 | Yamamoto et al. | |
| 2016/0286226 A1 | 9/2016 | Ridge et al. | |
| 2016/0300537 A1 | 10/2016 | Hoffman et al. | |
| 2016/0309154 A1 | 10/2016 | Rusanovskyy et al. | |
| 2016/0345017 A1 | 11/2016 | Lasserre et al. | |
| 2016/0360174 A1 | 12/2016 | Tao et al. | |
| 2016/0381363 A1 | 12/2016 | Tao et al. | |
| 2017/0026646 A1 * | 1/2017 | Minoo | H04N 19/124 |
| 2017/0085880 A1 | 3/2017 | Minoo et al. | |
| 2017/0103729 A1 | 4/2017 | Huang et al. | |
| 2017/0140513 A1 * | 5/2017 | Su | G06T 5/007 |
| 2017/0272690 A1 | 9/2017 | Seifi et al. | |
| 2017/0339433 A1 | 11/2017 | Mertens | |

(56) References Cited

U.S. PATENT DOCUMENTS

FOREIGN PATENT DOCUMENTS

| WO | WO 2015/036358 | 3/2015 |
|---|---|---|
| WO | WO 2015/130793 | 9/2015 |
| WO | WO 2016/020189 | 2/2016 |
| WO | WO 2016/049327 | 3/2016 |
| WO | WO 2016/120108 | 8/2016 |
| WO | WO 2016/124451 | 8/2016 |
| WO | WO 2016/192937 | 12/2016 |

OTHER PUBLICATIONS

Boitard et al., "Temporal Coherency for Video Tone Mapping," *Proc. SPIE Applications of Digital Image Processing*, vol. 8499, 10 pp. (Oct. 2012).
Guthier et al., "Flicker Reduction in Tone Mapped High Dynamic Range Video," *Proc. SPIE Color Imaging*, vol. 7866, 15 pp. (Jan. 2011).
Hart, "UHD Color for Games," Version 1.0, 41 pp. (Jun. 2016).
Kiser et al., "Real Time Automated Tone Mapping System for HDR Video," *IEEE Int'l Conf. on Image Processing*, 4 pp. (Sep. 2012).
Korshunov et al., "A JPEG Backward-compatible HDR Image Compression," *Int'l Society for Optics and Photonics*, 12 pp. (Oct. 2012).
Le Pendu, "Backward Compatible Approaches for the Compression of High Dynamic Range Videos," downloaded from World Wide Web, 2 pp. (Mar. 2016).
Mantiuk et al., "Backward Compatible High Dynamic Range MPEG Video Compression," *ACM Trans. on Graphics*, vol. 25, No. 3, 11 pp. (Jul. 2006).
Mantiuk et al., "Display Adaptive Tone Mapping," *ACM Trans. on Graphics*, vol. 27, No. 3, 10 pp. (Aug. 2008).
Meylan, "High Dynamic Range Image Rendering With a Retinex-Based Adaptive Filter," *IEEE Transactions on Image Processing*, vol. 15, No. 9, pp. 2820-2830 (2006).
Meylan, "Tone Mapping for High Dynamic Range Images," Ph.D. Thesis, Federal Institute of Technology in Lausanne, 175 pp. (Jul. 2006).
Shahid et al., "A New Hybrid Tone Mapping Scheme for High Dynamic Range (HDR) Videos," *IEEE Int'l Conf. on Consumer Electronics*, pp. 351-352 (Jan. 2015).
Touze et al., "HDR Video Coding Based on Local LDR Quantization," *Int'l Conf. and SME Workshop no HDR Imaging*, 6 pp. (Mar. 2014).
Melo et al., "Context-aware HDR Video Distribution for Mobile Devices," *Multimedia Tools and Applications*, vol. 76, No. 15, pp. 16605-16623 (Sep. 2016).
Melo, "High Dymamic Range Video for Mobile Devices," Ph.D. Thesis in Computer Science, Universidade de Tras-Os-Montes E Alto Douro, Portugal, 136 pp. (2015).
Melo et al., "Screen Reflections Impact on HDR Video Tone Mapping for Mobile Devices: an Evaluation Study," EURASIP Journal on Image and Video Processing, pp. 1-13 (Dec. 2015).
Dersch, "Interactive Java Viewer for HDR-panoramas," downloaded from the World Wide Web, 6 pp. (Dec. 2003).

* cited by examiner software 180 implementing one or more innovations described herein

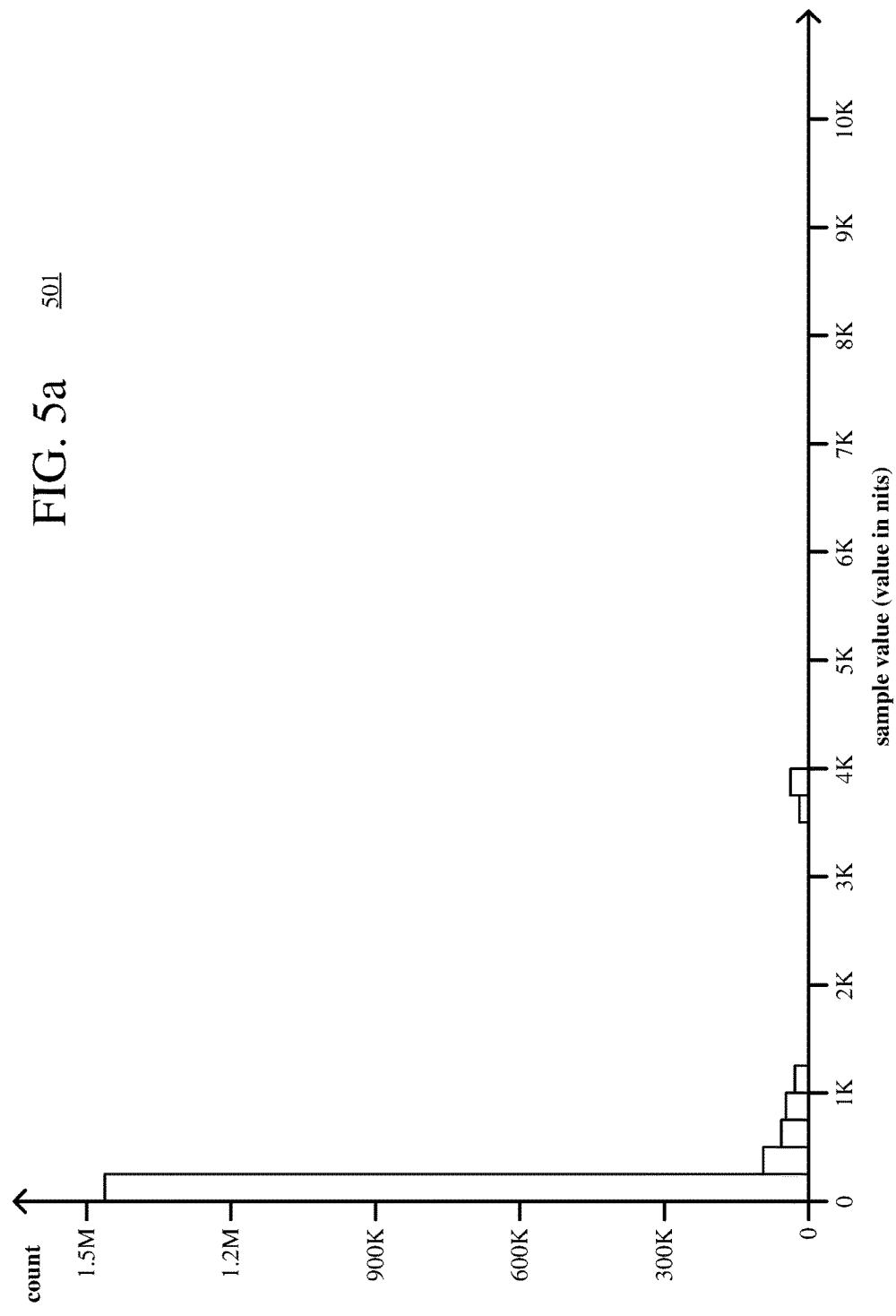

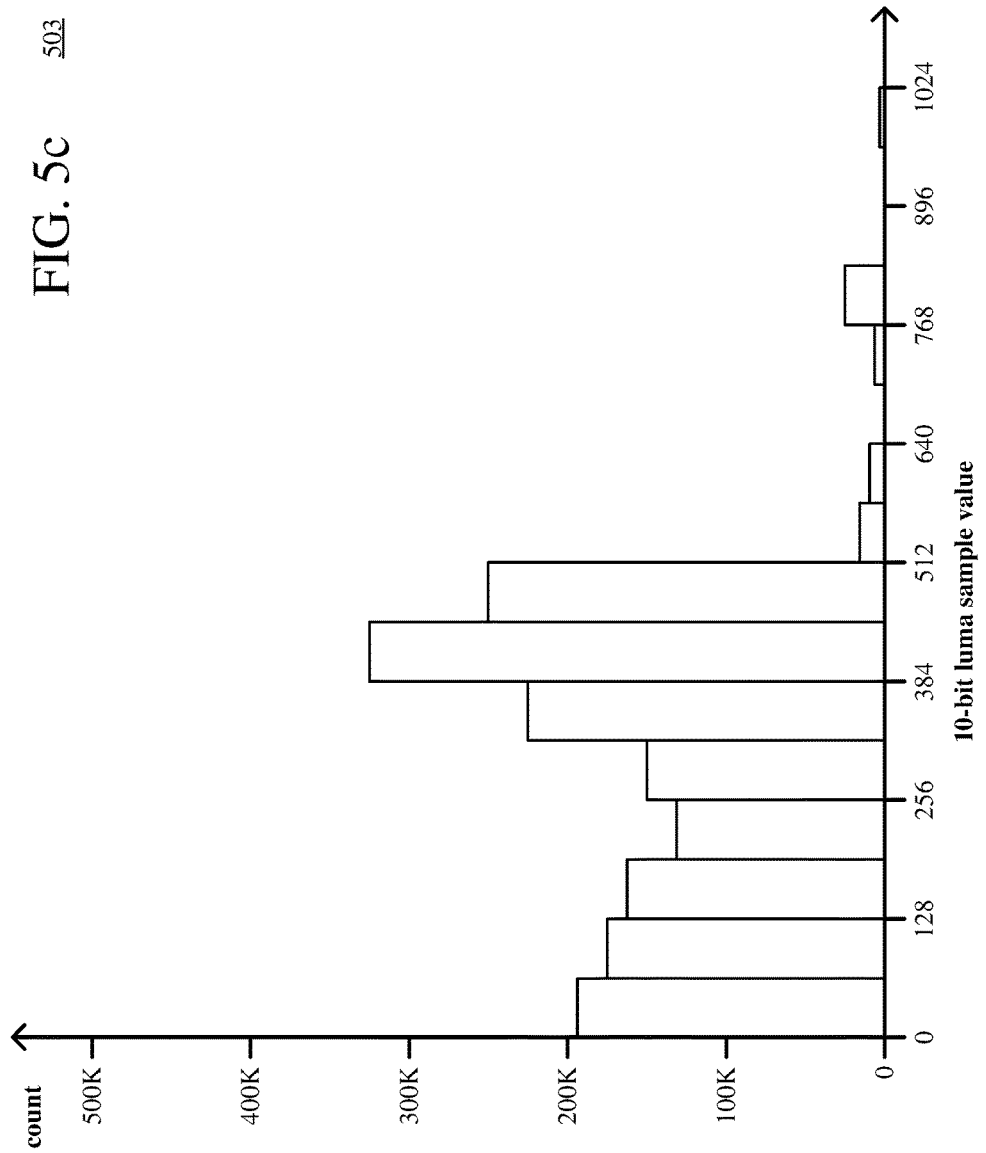

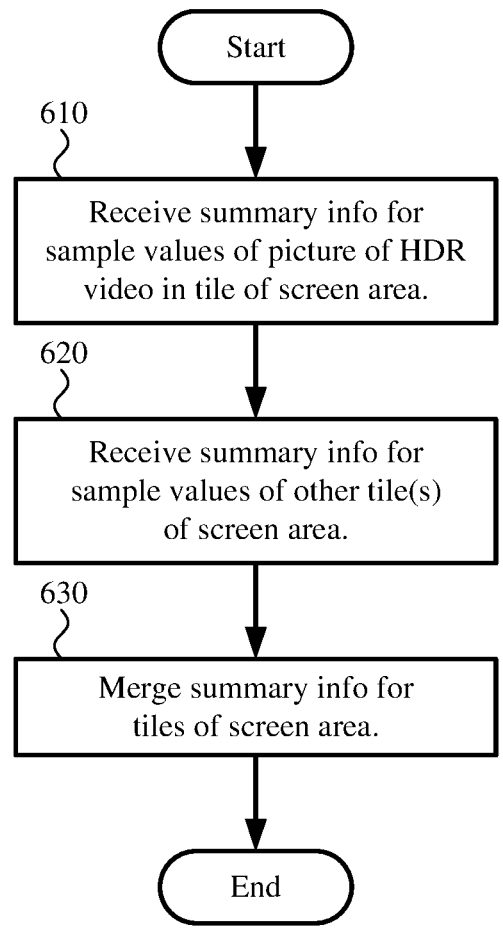
FIG. 6    600

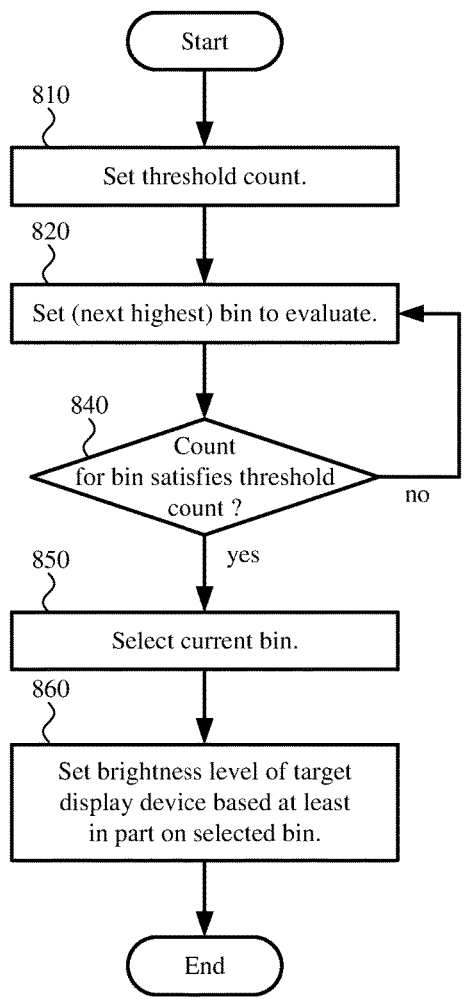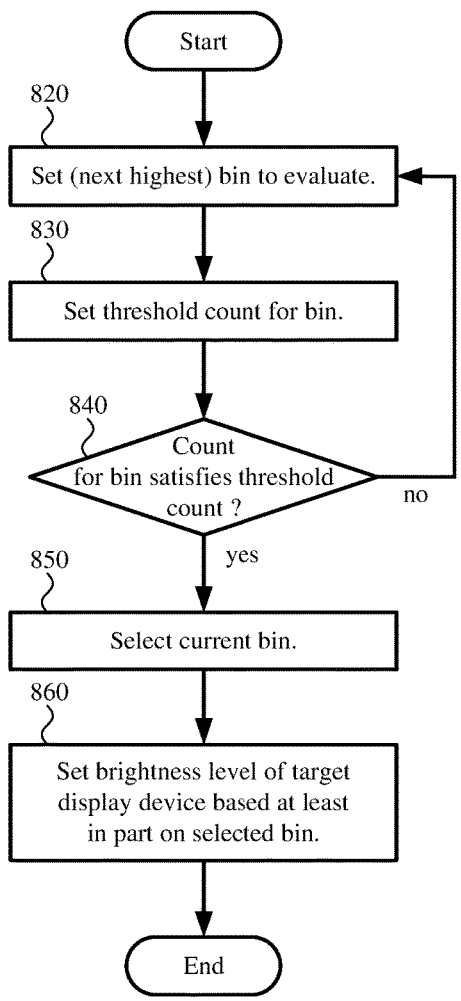

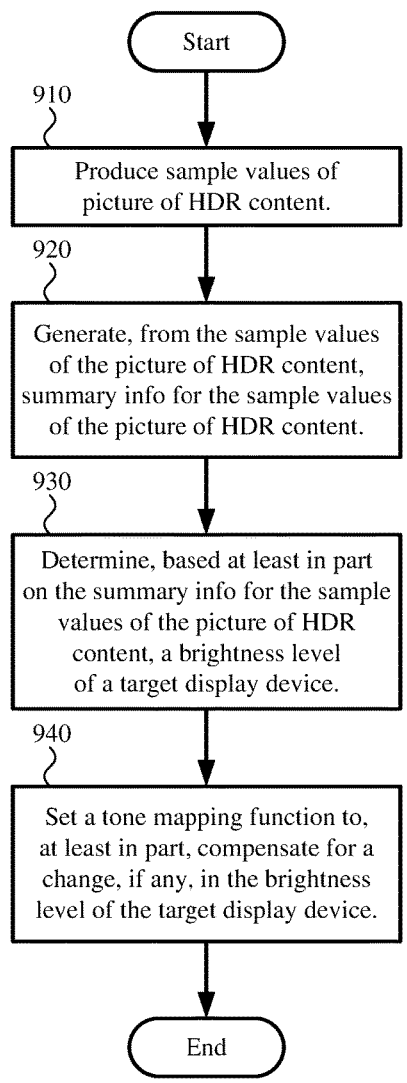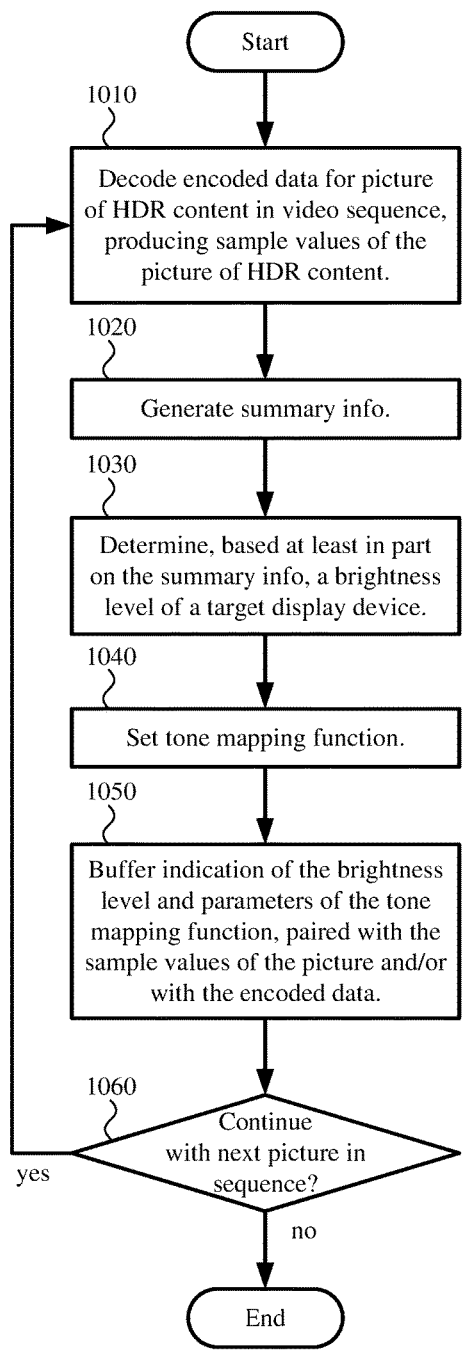

FIG. 11  1100
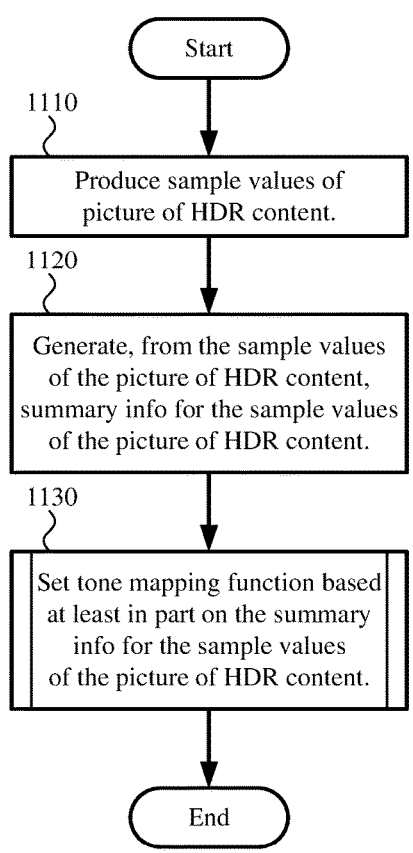
FIG. 12a  1201 (example of 1130)
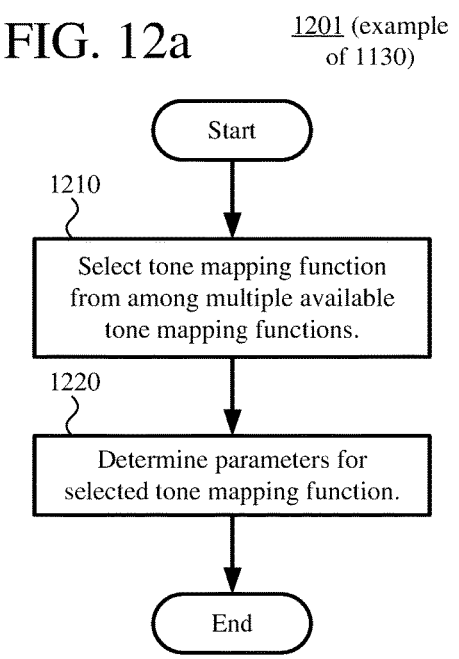

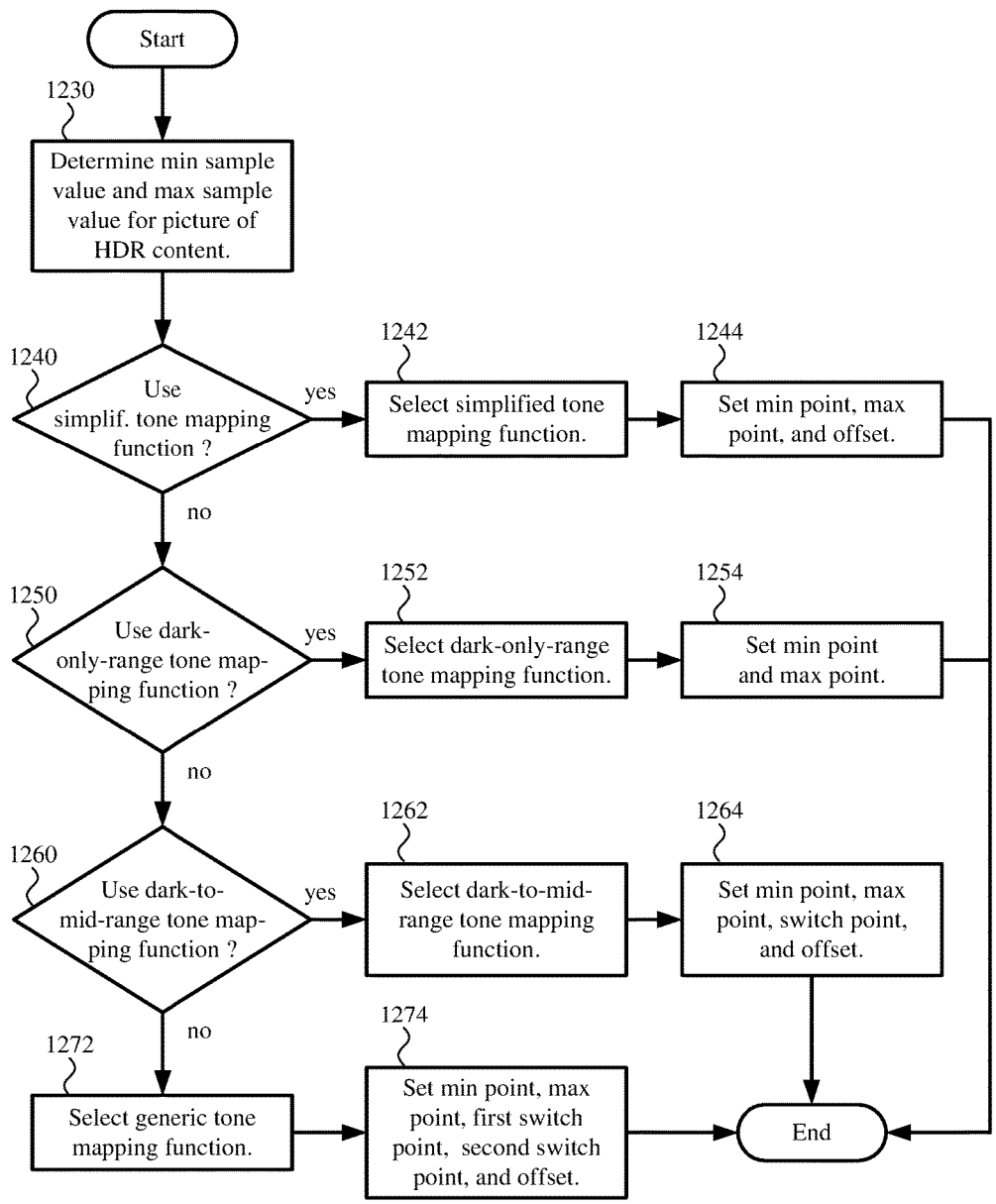

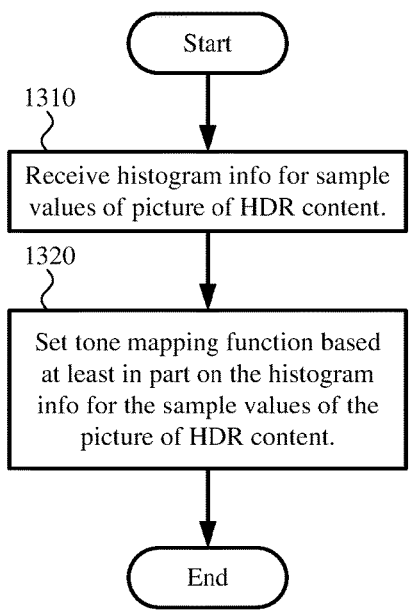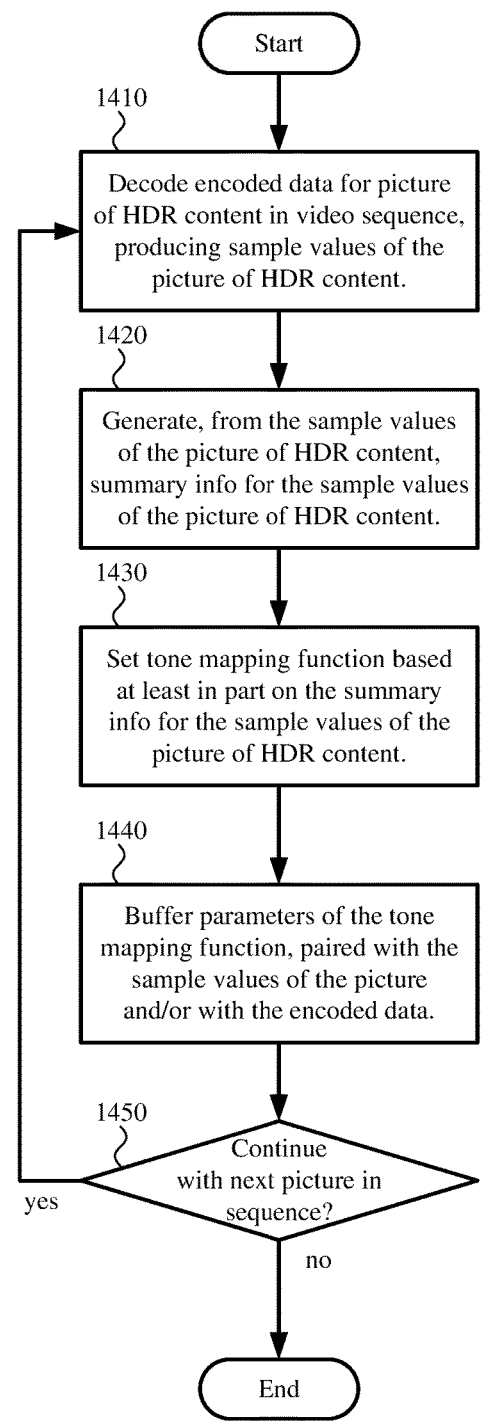

generic tone mapping function

1900

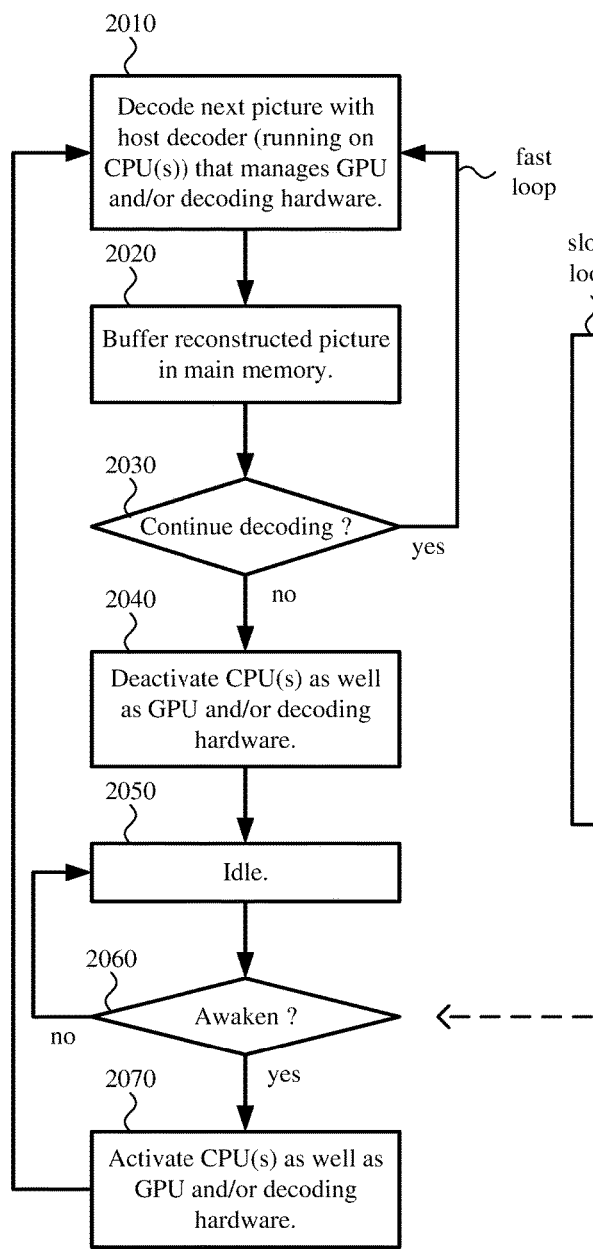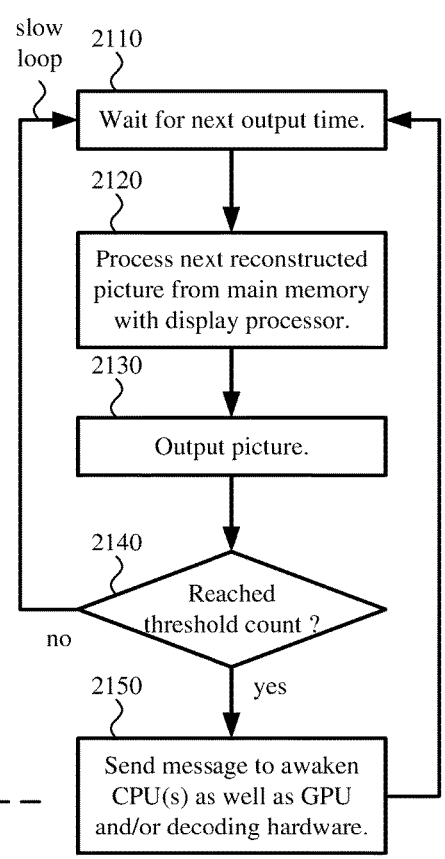
FIG. 20 2000
FIG. 21 2100

CONTENT-ADAPTIVE ADJUSTMENT OF DISPLAY DEVICE BRIGHTNESS LEVELS WHEN RENDERING HIGH DYNAMIC RANGE CONTENT

BACKGROUND

When video is streamed over the Internet and played back through a Web browser or media player, the video is delivered in digital form. Digital video is also used when video is delivered through many broadcast services, satellite services and cable television services. Real-time videoconferencing often uses digital video, and digital video is used during video capture with most smartphones, Web cameras and other video capture devices.

For standard dynamic range ("SDR"), digital video represents common colors in a relatively narrow range of brightness. Brightness can be measured in candelas per square meter ($cd/m^2$), which indicates luminous intensity per unit area. This unit of luminous intensity per unit area is called a "nit." A typical SDR display device may represent colors from pale colors through colors that are relatively vivid, in a brightness range from 0 nits to 100 nits. More recently, display devices having high dynamic range ("HDR") have been introduced. A typical HDR display device may represent colors in a wider color gamut (potentially representing colors that are more vivid or saturated) and in a larger brightness range (e.g., up to 1500 nits or 4000 nits). Video produced for playback on an HDR display device can have an even larger brightness range (e.g., 0 nits to 10,000 nits).

When HDR content is played back on an SDR display device, details in moderately bright sample values and very bright sample values are lost. For example, bright sample values above a certain threshold value (e.g., 100 nits) are clipped to the brightest sample value possible for the SDR display device, or bright sample values above a certain threshold value (e.g., 95 nits) are compressed to a very small range, so that a very wide range of bright sample values in the HDR content is represented with a small range of values on the SDR display device. On the other hand, when HDR content is played back on an HDR display device, the HDR display device can potentially display sample values in its full brightness range. In many cases when HDR content is played back on an HDR display device, however, the full brightness range is not needed.

SUMMARY

In summary, the detailed description presents innovations in rendering of high dynamic range ("HDR") content. By using some of the innovations, a playback system can dynamically and proactively improve computational efficiency and reduce power consumption when rendering the HDR content. By using other innovations, a playback system can improve quality when rendering the HDR content. Still other innovations provide ways to reduce power consumption during video playback by selectively deactivating decoding resources.

According to one aspect of the innovations described herein, a computer system implements a playback system that includes decision logic. The decision logic is configured to receive histogram information for sample values of a picture of HDR content. For example, the histogram information is organized as multiple bins, with each of the multiple bins representing a range of possible sample values between minimum and maximum possible sample value for the bin, and each of the multiple bins having a count of the sample values of the picture of HDR content (that is, the actual sample values) within that bin. The multiple bins can have variable size in terms of the range of possible sample values in the bins. In some example implementations, the sizes of at least some of the multiple bins increase by a factor of two between bins. The histogram information can be provided, for example, by a video decoder, metadata parser, or other source.

The decision logic is configured to determine, based at least in part on the histogram information, a brightness level of a target display device. In some example implementations, the decision logic is configured to select a highest bin among multiple bins of the histogram information that satisfies a threshold count (e.g., has at least the threshold count of the sample values of the picture of HDR content). For example, if a picture of HDR content includes bright sample values for features such as bright highlights, the highest bin that includes at least a threshold number of such bright sample values will be selected. The decision logic is further configured to set the brightness level of the target display device based at least in part on the selected bin (e.g., based on the maximum possible sample value for the selected bin). The decision logic can also consider characteristics of the target display device (e.g., peak brightness) and/or other information when determining the brightness level of the target display device.

The decision logic is further configured to set a tone mapping function to, at least in part, compensate for a change, if any, in the brightness level of the target display device. The tone mapping function can be set based at least in part on the histogram information. A tone mapper can be configured to apply tone mapping to input values for the sample values of the picture of HDR content, according to the tone mapping function, and thereby produce output values.

In some scenarios (e.g., when the target display device is connected to the playback system for immediate playback), the decision logic can be configured to send, to the target display device, a control signal that indicates the brightness level of the target display device. In other scenarios (e.g., when the target display device is not connected to the playback system for immediate playback, or when decoding and playback happen asynchronously), the decision logic can be configured to buffer an indication of the brightness level of the target display device, paired with the sample values of the picture of HDR content or with encoded data for the picture of HDR content, for later playback. Thus, the playback system can dynamically change the brightness level of the target display device, reducing power consumption by the target display device when the full brightness range of the target display device is not needed. Further, the playback system can proactively change the brightness level of the target display device depending on the HDR content to be rendered, changing the brightness level of the target display device so that sample values can be rendered in the appropriate brightness range without any time lag as the brightness level adjusts. In this way, the playback system can improve video quality by selecting an appropriate brightness level and associated processing.

According to another aspect of the innovations described herein, a playback system locally analyzes sample values of a picture of HDR content in order to generate summary information for the sample values of the picture of HDR content, which is used to determine a brightness level of a target display device. Sample values of a picture of HDR content are produced (e.g., by a video decoder that reconstructs HDR content, or by a game console that renders HDR content, or otherwise). Then, from the sample values of the picture of HDR content, summary information is generated. The summary information can be histogram information or some other type of information that summarizes characteristics of the sample values of the picture of HDR content. For example, a video decoder is configured to compute the summary information from the sample values of the picture of HDR content. Or, as another example, a digital signal processor or other module outside of the video decoder is configured to compute the summary information from the sample values of the picture of HDR content. Thus, even if summary information is not provided in a file or stream for the picture of HDR content, summary information is available to the playback system to control the brightness level of a target display device. Decision logic in the playback system is configured to determine, based at least in part on the summary information for the sample values of the picture of HDR content, a brightness level of a target display device. The decision logic can also consider characteristics of the target display device (e.g., peak brightness) and/or other information when determining the brightness level of the target display device. The decision logic is further configured to set a tone mapping function to, at least in part, compensate for a change, if any, in the brightness level of the target display device. The tone mapping function can be set based at least in part on the summary information. A tone mapper can be configured to apply tone mapping to input values for the sample values of the picture of HDR content, according to the tone mapping function, and thereby produce output values.

According to another aspect of the innovations described herein, a playback system pairs brightness levels and parameters of a tone mapping function with corresponding pictures of HDR content in a video sequence. A video decoder is configured to decode encoded data for the picture of HDR content, thereby producing sample values of the picture of HDR content. Summary information is generated for the sample values of the picture of HDR content. The summary information can be histogram information or some other type of information that summarizes characteristics of the sample values of the picture of HDR content. The summary information can be generated by a metadata extractor, which is configured to extract metadata indicating the summary information from the encoded data, by the video decoder, which is configured to compute the summary information from the sample values, or by another module. Decision logic in the playback system is configured to determine, based at least in part on the summary information for the sample values of the picture of HDR content, a brightness level of a target display device. The decision logic can also consider characteristics of the target display device (e.g., peak brightness) and/or other information when determining the brightness level of the target display device. The decision logic is further configured to set a tone mapping function to, at least in part, compensate for a change, if any, in the brightness level of the target display device. The tone mapping function can be set based at least in part on the summary information. The decision logic is configured to buffer an indication of the brightness level of the target display device and parameters of the tone mapping function that matches the brightness level. The indication of the brightness level and the parameters of the tone mapping function are paired with the sample values of the picture of HDR content and/or with the encoded data for the picture of HDR content. In this way, the playback system can queue brightness levels and matching tone mapping functions for multiple pictures in a video sequence for later playback.

According to another aspect of the innovations described herein, a computer system implements a playback system that includes decision logic. The decision logic is configured to receive histogram information for the sample values of a picture of HDR content. For example, the histogram information can be organized as described above. The decision logic is further configured to set a tone mapping function based at least in part on the histogram information. For example, the decision logic can be configured to select a highest bin among multiple bins of histogram information that satisfies a threshold count (e.g., has at least the threshold count of the sample values of the picture of HDR content) and set a maximum point of the tone mapping function based at least in part on the selected bin. As another example, the decision logic can be configured to select the tone mapping function (e.g., an optimal or otherwise appropriate tone mapping function), from among multiple available tone mapping functions, based at least in part on the histogram information, and also set parameters for the selected tone mapping function. The multiple available tone mapping functions can include a simplified tone mapping function (with only linear mapping), which can be selected to reduce computational complexity when possible, a dark-only-range tone mapping function (when all or almost all sample values are dark sample values), a dark-to-mid-range tone mapping (when there are not a significant number of bright sample values), and a generic tone mapping function. In this way, the playback system can adjust the tone mapping function to reduce power consumption (by simplifying tone mapping) and/or improve quality (by making output values more fine-grained within an appropriate brightness range). The decision logic can be configured to buffer parameters of the tone mapping function, pairing the parameters of the tone mapping function with the sample values of the picture of HDR content and/or with encoded data for the picture of HDR content. A tone mapper can be configured to apply tone mapping to input values for sample values of a picture of HDR content, according to the tone mapping function, and thereby produce output values.

According to another aspect of the innovations described herein, a playback system locally analyzes sample values of a picture of HDR content in order to generate summary information for the sample values of the picture of HDR content, which is used to set a tone mapping function. Sample values of a picture of HDR content are produced (e.g., by a video decoder that reconstructs HDR content, or by a game console that renders HDR content, or otherwise). Then, from the sample values of the picture of HDR content, summary information is generated. The summary information can be histogram information or some other type of information that summarizes characteristics of the sample values of the picture of HDR content. For example, a video decoder is configured to compute the summary information from the sample values of the picture of HDR content. Or, as another example, a digital signal processor or other module outside of the video decoder is configured to compute the summary information from the sample values of the picture of HDR content. Thus, even if summary information is not provided in a file or stream for the picture of HDR content, summary information is available to the playback system to set the tone mapping function. Decision logic in the playback system is configured to set a tone mapping function based at least in part on the summary information for the sample values of the picture of HDR content. For example, the decision logic can be configured to select the tone mapping function (e.g., an optimal or otherwise appropriate tone mapping function), from among multiple available tone mapping functions such as those described above, based at least in part on the summary information, and also set parameters for the selected tone mapping function. A tone mapper can be configured to apply tone mapping to input values for the sample values of the picture of HDR content, according to the tone mapping function, and thereby produce output values.

According to another aspect of the innovations described herein, a playback system pairs parameters of a tone mapping function with corresponding pictures of HDR content in a video sequence. A video decoder is configured to decode encoded data for the picture of HDR content, thereby producing sample values of the picture of HDR content. Summary information is generated for the sample values of the picture of HDR content. The summary information can be histogram information or some other type of information that summarizes characteristics of the sample values of the picture of HDR content. The summary information can be generated by a metadata extractor, which is configured to extract metadata indicating the summary information from the encoded data, by the video decoder, which is configured to compute the summary information from the sample values, or by another module. Decision logic in the playback system is configured to set a tone mapping function based at least in part on the summary information for the sample values of the picture of HDR content. The decision logic is configured to buffer parameters of the tone mapping function, pairing the parameters of the tone mapping function with the sample values of the picture of HDR content and/or with the encoded data for the picture of HDR content. In this way, the playback system can queue parameters of the tone mapping functions for multiple pictures in a video sequence for later playback.

Different target display devices can have different limits with respect to peak brightness and power usage. According to the preceding innovations, a playback system can adjust the brightness level of a target display device and/or associated tone mapping function so as to stay within the constraints of the target display device for peak brightness and power usage.

According to another aspect of the innovations described herein, a video playback system is configured to selectively deactivate decoding resources in order to reduce power consumption. For example, decoding resources can be deactivated when the decoding resources are idle or not needed. With a host decoder that runs on one or more central processing units ("CPUs") and manages a graphics processing unit ("GPU") and/or special-purpose decoding hardware, the video playback system can quickly decode a batch of pictures and store the reconstructed pictures in picture buffers in main memory. Brightness levels and/or parameters for tone mapping functions can be buffered in association with (that is, paired with) corresponding pictures for later playback. The video playback system can then deactivate the CPU(s) and GPU/decoding hardware. With a display processor, the video playback system can periodically retrieve one of the reconstructed pictures and perform operations (e.g., for color conversion, tone mapping) to render the picture for output on a display device. When most of the reconstructed pictures have been output, the video playback system can re-activate the CPU(s) and GPU/decoding hardware, which resume decoding operations for another batch of pictures.

The innovations can be implemented as part of a method, as part of a computer system configured to perform operations for the method, or as part of one or more computer-readable media storing computer-executable instructions for causing a computer system to perform the operations for the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIGS. 5a-5c are diagrams illustrating examples of histogram information for sample values of a picture of HDR content.

FIG. 6 is a diagram illustrating a generalized technique for merging summary information for different tiles to be rendered in a screen area.

FIGS. 8a and 8b are flowcharts illustrating example techniques for determining the brightness level of a target display device based on histogram information for sample values of a picture of HDR content.

FIG. 9 is a flowchart illustrating an example technique for content-adaptive adjustment of the brightness level of a target display device using locally-generated summary information, for rendering HDR content.

FIG. 10 is a flowchart illustrating an example technique for associating brightness levels of a target display device with corresponding pictures of HDR content, for later playback of the pictures of HDR content.

FIG. 11 is a flowchart illustrating a example technique for content-adaptive adjustment of tone mapping using locally-generated summary information, for rendering HDR content.

FIGS. 12a and 12b are flowcharts illustrating example techniques for setting a tone mapping function based on summary information for sample values of a picture of HDR content.

FIG. 13 is a flowchart illustrating an example technique for setting a tone mapping function using histogram information, for rendering HDR content FIG. 14 is a flowchart illustrating an example technique for associating tone mapping functions with corresponding pictures of HDR content, for later playback of the pictures of HDR content.

FIGS. 20 and 21 are flowcharts illustrating example techniques for video decoding and display processing, respectively, during which one or more CPUs as well as a GPU and/or special-purpose decoding hardware are selectively deactivated between periods of activity.

DETAILED DESCRIPTION

The detailed description presents innovations in rendering of high dynamic range ("HDR") content. For example, a playback system can dynamically and proactively adjust the brightness level of a target display device. In some cases, this can help reduce power consumption when rendering HDR content, without any noticeable degradation in quality. As another example, a playback system can adjust a tone mapping function used when rendering the HDR content. In this way, the playback system can improve quality when rendering HDR content. The detailed description also describes innovative ways to reduce power consumption during video playback by selectively deactivating decoding resources.

Many of the examples described herein involve playback of HDR video. A video playback system decodes pictures of HDR video and renders the reconstructed pictures of HDR video for output to a target display device. In doing so, the video playback system can adjust the brightness level of the target display device, adjust a tone mapping function, and/or selectively deactivate certain decoding resources using one or more of the innovations described herein. The innovations described herein can also be used in other contexts. For example, content-adaptive adjustment of the brightness level of a target display device and/or content-adaptive adjustment of a tone mapping function can be used when transcoding from HDR video to SDR video or transcoding HDR image content to SDR image content (in offline transcoding or otherwise). As another example, content-adaptive adjustment of the brightness level of a target display device can be used when a gaming console renders HDR content during gameplay or when a compositor composites HDR content in different tiles for display. As another example, selective deactivation of decoding resources can be used when decoding non-HDR video.

In the examples described herein, identical reference numbers in different figures indicate an identical component, module, or operation. Depending on context, a given component or module may accept a different type of information as input and/or produce a different type of information as output.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems.

I. Example Computer Systems.

Figure 1:
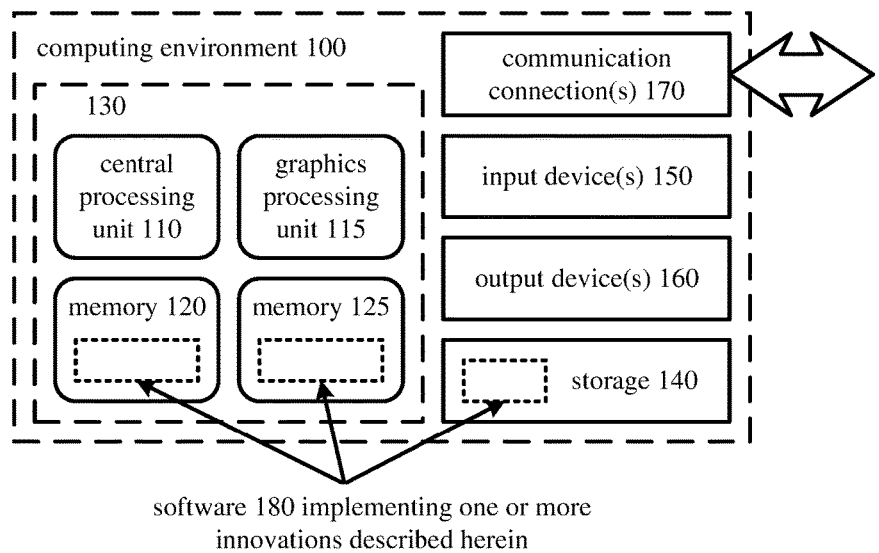
FIG. 1 is a diagram illustrating an example computer system in which some described embodiments can be implemented.

FIG. 1 illustrates a generalized example of a suitable computer system (100) in which several of the described innovations may be implemented. The computer system (100) is not intended to suggest any limitation as to scope of use or functionality, as the innovations may be implemented in diverse general-purpose or special-purpose computer systems.

With reference to FIG. 1, the computer system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a CPU (110) as well as a GPU (115). In general, the GPU (115) is any specialized circuit, different from the CPU (110), that accelerates creation and/or manipulation of image data in a graphics pipeline. The GPU (115) can be implemented as part of a dedicated graphics card (video card), as part of a motherboard, as part of a system on a chip ("SoC"), or in some other way (even on the same die as the CPU (110)).

The tangible memory (120, 125) may be volatile memory (e.g., registers, cache, RAM), non-volatile memory (e.g., ROM, EEPROM, flash memory, etc.), or some combination of the two, accessible by the processing unit(s). In FIG. 1, the memory (120) is CPU memory, accessible to the CPU (110), and the memory (125) is GPU memory, accessible to the GPU (115). Depending on architecture (e.g., whether the GPU (115) is part of a video card, motherboard, or SoC), the CPU memory can be completely separate from the GPU memory, or the CPU memory and GPU memory can, at least in part, be shared memory or drawn from the same source (e.g., RAM). The memory (120, 125) stores software (180) implementing one or more innovations described herein, in the form of computer-executable instructions suitable for execution by the processing unit(s).

A computer system may have additional features. For example, the computer system (100) includes storage (140), one or more input devices (150), one or more output devices (160), and one or more communication connections (170). An interconnection mechanism (not shown) such as a bus, controller, or network interconnects the components of the computer system (100). Typically, operating system ("OS") software (not shown) provides an operating environment for other software executing in the computer system (100), and coordinates activities of the components of the computer system (100).

The tangible storage (140) may be removable or non-removable, and includes magnetic storage media such as magnetic disks, magnetic tapes or cassettes, optical storage media such as CD-ROMs or DVDs, or any other medium which can be used to store information and which can be accessed within the computer system (100). The storage (140) can store instructions for the software (180) implementing one or more innovations described herein.

The input device(s) (150) may be a touch input device such as a keyboard, mouse, pen, or trackball, a voice input device, a scanning device, or another device that provides input to the computer system (100). For video, the input device(s) (150) may be a camera, video card, screen capture module, TV tuner card, or similar device that accepts video input in analog or digital form, or a CD-ROM or CD-RW that reads video input into the computer system (100). The output device(s) (160) may be a computer monitor, television screen, or other display device, printer, speaker, CD-writer, or another device that provides output from the computer system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computer system (100), computer-readable media include memory (120, 125), storage (140), and combinations thereof. As used herein, the term computer-readable media does not include transitory signals or propagating carrier waves.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

For the sake of presentation, the detailed description uses terms like "determine" and "select" to describe computer operations in a computer system. These terms denote operations performed by a computer, and should not be confused with acts performed by a human being. The actual computer operations corresponding to these terms vary depending on implementation.

As used herein, the term "send" denotes any way of conveying information from one component to another component, and the term "receive" denotes any way of getting information at one component from another component. The two components can be part of the same computer system or different computer systems. The information can be passed by value (e.g., as a parameter of a message or function call) or passed by reference (e.g., in a buffer). Depending on context, the information can be communicated directly between the two components or be conveyed through one or more intermediate components. As used herein, the term "connected" denotes an operable communication link between two components, which can be part of the same computer system or different computer systems. The operable communication link can be a wired or wireless network connection, which can be direct or pass through one or more intermediate components (e.g., of a network).

II. Example Network Environments.

Figure 2A:
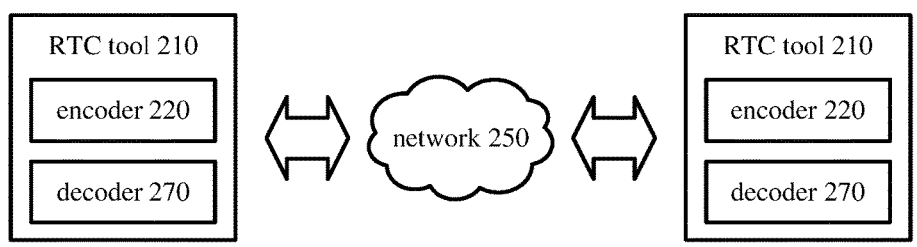
FIGS. 2a and 2b are diagrams illustrating example network environments in which some described embodiments can be implemented.
Figure 2B:

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the H.265/HEVC standard, ISO/IEC 14496-10 standard (also known as H.264/AVC), another standard, or a proprietary format such as VP8 or VP9, or a variation or extension thereof, with a corresponding decoder (270) accepting and decoding encoded data from the encoder (220). The bidirectional communication can be part of a video conference, video telephone call, or other two-party or multi-party communication scenario. Although the network environment (201) in FIG. 2a includes two RTC tools (210), the network environment (201) can instead include three or more RTC tools (210) that participate in multi-party communication.

Figure 4A:
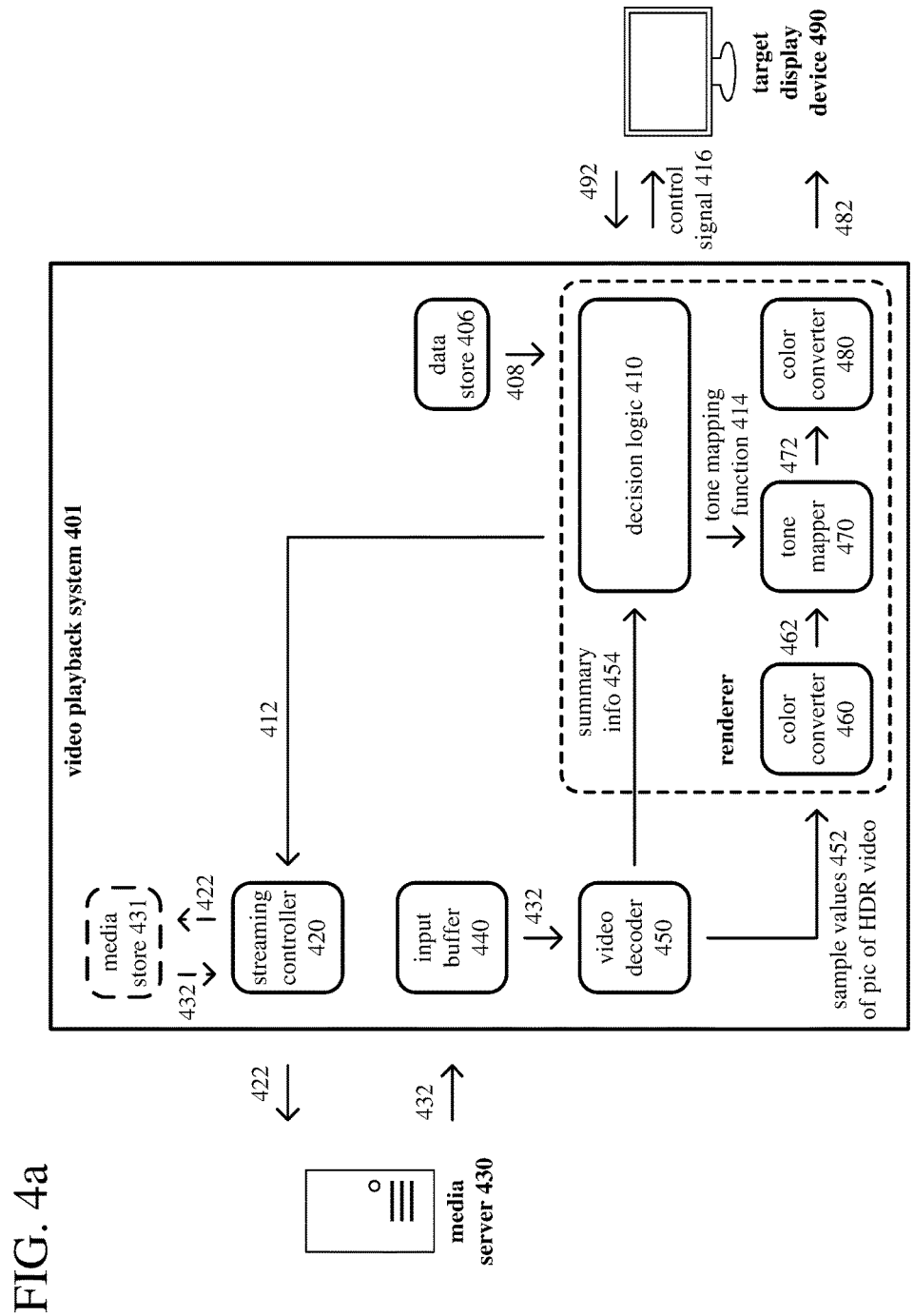
FIGS. 4a-4c are diagrams illustrating example architectures for rendering of HDR video on a target display device, including adjustment of brightness level of the target display device and/or adjustment of a tone mapping function based on summary information for sample values of the HDR video.
Figure 4B:
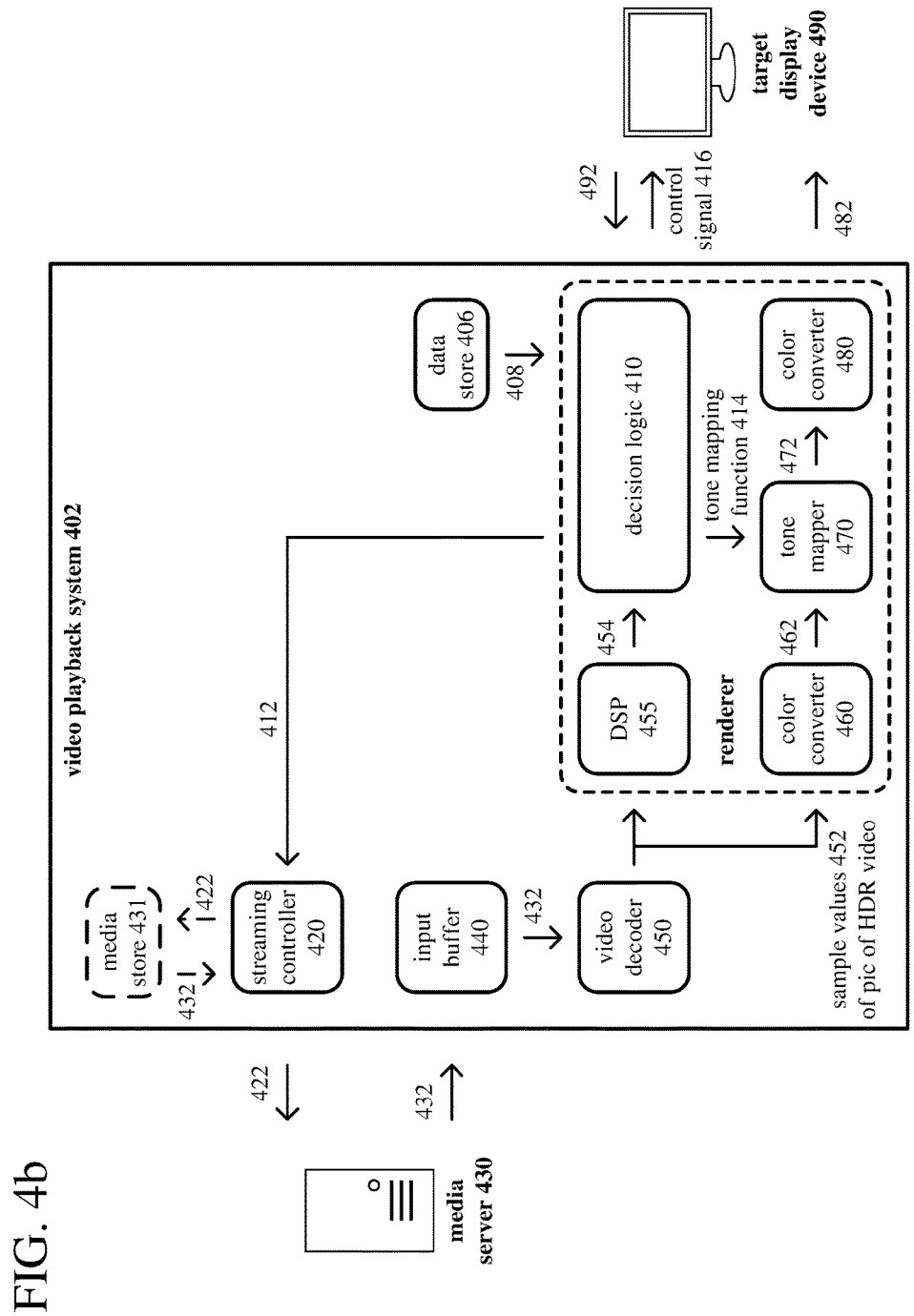
Figure 4C:
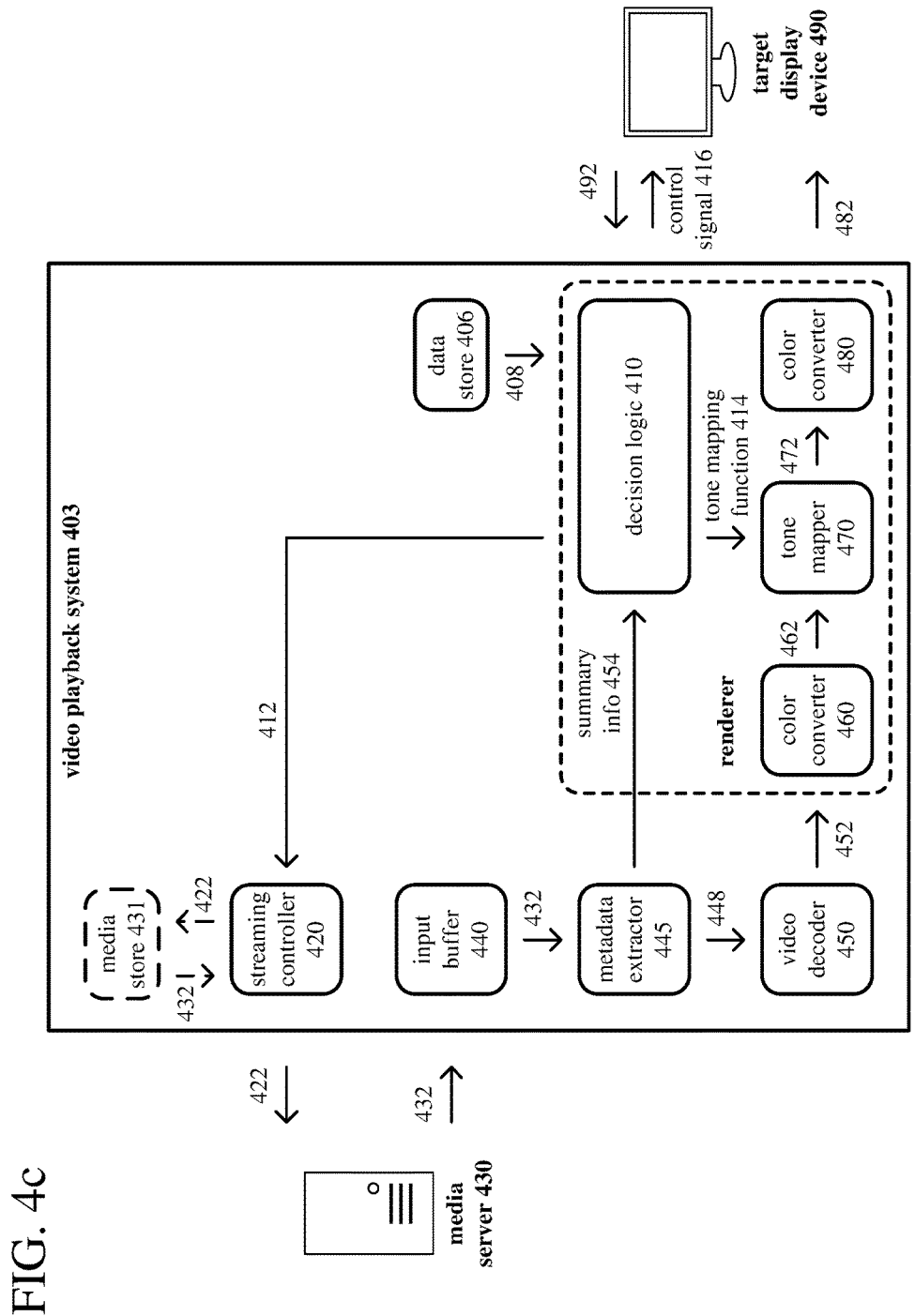

An RTC tool (210) manages encoding by an encoder (220) and also manages decoding by a decoder (270). FIGS. 4a-4c show example video playback systems (401, 402, 403) that can be included in the RTC tool (210). Alternatively, the RTC tool (210) uses another video playback system.

In the network environment (202) shown in FIG. 2b, an encoding tool (212) includes an encoder (220) that encodes video for delivery to multiple playback tools (214), which include decoders (270). The unidirectional communication can be provided for live broadcast video streaming, a video surveillance system, web camera monitoring system, remote desktop conferencing presentation or sharing, wireless screen casting, cloud computing or gaming, live gameplay broadcast, or another scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

The encoding tool (212) can include server-side controller logic for managing connections with one or more playback tools (214). A playback tool (214) can include client-side controller logic for managing connections with the encoding tool (212). FIGS. 4a-4c show example video playback systems (401, 402, 403) that can be included in the playback tool (214). Alternatively, the playback tool (214) uses another video playback system.

Alternatively, a Web server or other media server can store encoded video for delivery to one or more playback tools (214), which include decoders (270). The encoded video can be provided, for example, for on-demand video streaming, broadcast, or another scenario in which encoded video is sent from one location to one or more other locations. A playback tool (214) can communicate with the media server to determine a stream of video for the playback tool (214) to receive. The media server can include server-side controller logic for managing connections with one or more playback tools (214). A playback tool (214) receives the stream, buffers the received encoded data for an appropriate period, and begins decoding and playback.

III. Example Formats for HDR Video.

HDR video can be organized in any of various formats, which may vary in terms of bits per sample value, dynamic range, and color gamut. For example, an HDR video format can use 10 bits per sample value, 12 bits per sample value, or some other number of bits per sample value. The dynamic range of sample values in an HDR video format can be 0 nits to 1000 nits, 0 nits to 1500 nits, 0 nits to 4000 nits, 0 nits to 10000 nits, or some other dynamic range. Typically, the peak brightness for an HDR video format is at least 1000 nits. With respect to color gamut, HDR video typically has a wider color gamut than SDR video, which means the HDR video can potentially represent colors that are more saturated, or vivid.

The spatial resolution of HDR video can be 720p (1280 sample values×720 sample values), 1080p (1920 sample values×1080 sample values), UHD (3840 sample values× 2160 sample values), or some other number of sample values per picture. In general, a pixel is the set of one or more collocated sample values for a location in a picture, which may be arranged in different ways for different chroma sampling formats. Typically, before encoding, the sample values of video are converted to a color space such as YUV, in which sample values of a luma (Y) component represent brightness or intensity values, and sample values of chroma (U, V) components represent chroma values. The precise definitions of the chroma values (and conversion operations between a YUV-type color space and another color space such as an RGB-type color space) depend on implementation. In general, as used herein, the term YUV-type color space indicates any color space with a luma (or luminance) component and one or more chroma (or chrominance) components, including Y'UV, YIQ, Y'IQ and YDbDr as well as variations such as YCbCr and YCoCg. Chroma sample values may be sub-sampled to a lower chroma sampling rate (e.g., for a YUV 4:2:0 format) in order to reduce the spatial resolution of chroma sample values, or the chroma sample values may have the same resolution as the luma sample values (e.g., for a YUV 4:4:4 format). The term RGB-type color space indicates a color space that includes R, G, and B components in any order, which may be the color space used for a display device.

When image content is created for video, the signal captured by a camera (or multiple cameras, for some approaches to capturing HDR video) is converted from an optical signal to an electrical signal using an opto-electrical transfer function ("OETF"). In an example OETF, output values are assigned to input brightness values (in nits). For HDR video, one goal of the OETF is to maintain dynamic range and wide color gamut. Several OETFs have been described in format specifications, including S-Log 3, ST 2084, and HLG.

In some example implementations, HDR video has 10 bits per sample value (e.g., HDR-10 format). The sample values are in a YUV-type color space with 4:2:0 chroma sampling format. Sample values are organized as a Y plane followed by an interleaved U/V plane with 2×2 subsampling.

Figure 3:
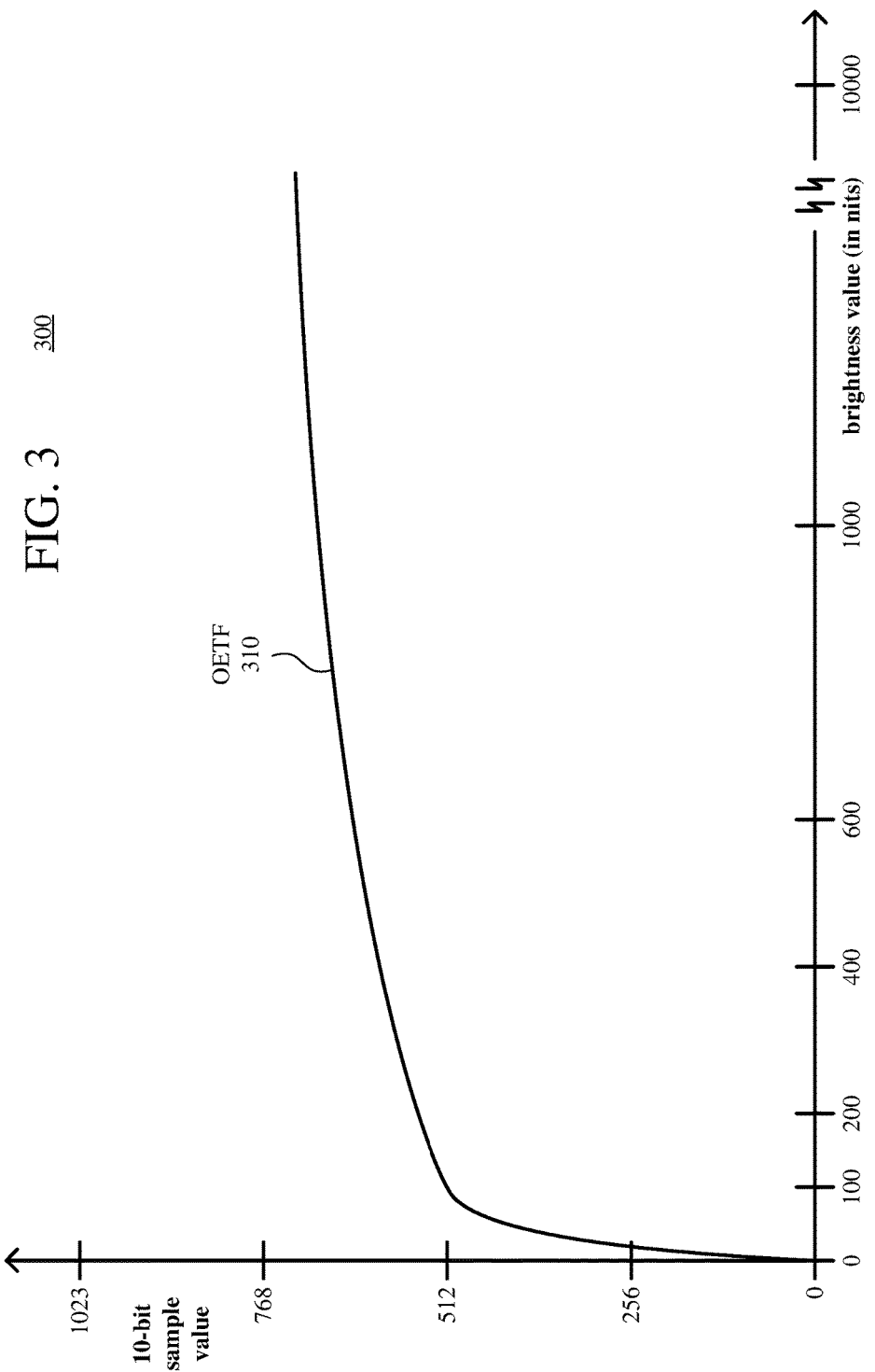
FIG. 3 is a diagram illustrating an example opto-electrical transfer function for HDR content.

FIG. 3 shows an example (300) that includes an OETF (310) for HDR video. In the example (300), output values are 10-bit sample values, for a range of 0 to 1023. Input values are brightness values in the range of 0 nits to 10000 nits. For the OETF (310), a relatively small range of input values up to a peak brightness for SDR video (e.g., from 0 nits to 100 nits) is assigned to a significant proportion of the range for output values (e.g., from 0 to 511). Within this range, dark sample values (e.g., from 0 nits to 2 nits) are represented with very fine gradations of output values (e.g., 0 to 200). This is an example of range expansion. The range of input values is assigned to a larger range of output values, which helps preserve details of dark sample values during later processing such as encoding.

Input values above the peak brightness for SDR video (e.g., above 100 nits) are assigned to the remaining range of output values (e.g., from 512 to 1023), with gradations between input values (per step in output value) becoming progressively wider as brightness values increase. For example, input values from 101 nits to 400 nits are assigned to output values in the range of 512 to 640, input values from 401 nits to 2000 nits are assigned to output values in the range of 641 to 768, and input values from 2001 nits to 10000 nits are assigned to output values in the range of 769 to 1023. The 1000 input values that are brightest (from 9000 nits to 10000 nits) may be represented with very small range of output values (e.g., 1014 to 1023). This is an example of range compression. A range of input values is assigned to a smaller range of output values, which helps preserve some details of bright sample values during later processing such as encoding, with more details being preserved for less bright sample values.

IV. Example Architectures for Rendering of HDR Video.

When a video playback system receives HDR video, rendering of the HDR video on an HDR display device provides the highest quality. Many current display devices have a dynamic range less than HDR, however. Some of these non-HDR display devices are SDR display devices (e.g., having a peak brightness of 100 nits). Other non-HDR display devices have a higher peak brightness such as 400 nits or 600 nits, which provides "brightness headroom" within which details of bright sample values can be rendered. This section describes various aspects of example architectures for rendering HDR video on display devices.

FIG. 4a shows an example architecture for rendering of video on a target display device (490). In addition to the target display device (490) and media server (430), the example architecture includes a video playback system (401) connected to the target display device (490) and connected to the media server (430) (that is, having operable communication links with the target display device (490) and media server (430)). The video playback system (401) includes a data store (406), decision logic (410), streaming controller (420), input buffer (440), video decoder (450), tone mapper (470), first color converter (460) before the tone mapper (470), and second color converter (480) after the tone mapper (470). In the scenario shown in FIG. 4a, HDR video is rendered on the target display device (490). In other scenarios, HDR video can be processed for later playback on the target display device (490).

The target display device (490) can be a computer monitor, television screen, mobile device screen, or other type of display device that has a screen area. For its connection to the video playback system (401), the target display device (490) can be connected over a local wired connection (e.g., such as an HDMI connector or DisplayPort connector), over a local wireless connection, or over a network connection between distributed computer systems. The target display device (490) can be an HDR display device, for example, having a spatial resolution of 1080p, UHD or higher, supporting a wide color gamut, and having a peak brightness of 1000 nits, 1500 nits, 4000 nits, or higher. Or, the target display device (490) can be an enhanced dynamic range ("EDR") display device, for example, having a spatial resolution of 720p, 1080p, UHD or higher, supporting a narrow color gamut, and having a peak brightness above 100 nits but below 1000 nits. Or, the target display device (490) can be an SDR display device, for example, having a spatial resolution of 720p, 1080p, UHD or higher, supporting a narrow color gamut, and having a peak brightness of 100 nits.

The target display device (490) can report various information (492) to the video playback system (401), including the peak brightness of the target display device (490), an ambient light level and/or ambient light color in the environment around the target display device (490) (e.g., from an ambient light sensor), or other information. Some of the information can be reported dynamically (e.g., ambient light level and/or ambient light color) while other information can be reported dynamically or at the time of installation (e.g., peak brightness of the target display device (490)).

In FIG. 4a, the target display device (490) is connected to the video playback system (401). Alternatively, the video playback system (401) can process HDR video for playback on one or more target display devices not yet connected to the video playback system (401).

The data store (406) is configured to store settings (408). For example, the settings (408) include information provided by the target display device (490), as well as information such as whether the target display device (490) is in a power-saving mode and whether brightness of the target display device (490) can be controlled programmatically. The data store (406) can send the settings (408) to the decision logic (410) when requested. Other modules can interact with the data store (406) across an application programming interface ("API"), such as a graphics API of the operating system.

The decision logic (410) is configured to make various decisions about rendering, including the brightness level of the target display device (490) and the tone mapping function (414) for the tone mapper (470) to use. The decision logic (410) can consider various information when making the decisions. In particular, the decision logic (410) is configured to receive summary information (454) for sample values of a picture of HDR video. In some example implementations, the summary information (454) is histogram information organized as multiple bins. Each of the bins represents a range of possible sample values between a minimum possible sample value for the bin and a maximum possible sample value for the bin. Also, each of the bins has a count of the sample values of the picture of HDR video within that bin. Examples of histogram information are described in section V. Alternatively, the summary information (454) is some other type of information (e.g., minimum sample value, maximum sample value) characterizing the sample values of a picture of HDR video. In FIG. 4a, the decision logic (410) receives the summary information (454) from the video decoder (450). Alternatively, the decision logic (410) can receive the summary information (454) from another source.

The decision logic (410) is configured to determine, based at least in part on the summary information (454), a brightness level of the target display device (490). For example, to determine the brightness level of the target display device (490), the decision logic (410) is configured to select a highest bin, among multiple bins of histogram information, that satisfies a threshold count (e.g., includes at least the threshold count of the sample values of the picture of HDR video), then set the brightness level of the target display device (490) based at least in part on the selected bin. The threshold count depends on implementation and can be, for example, 20, 50, 100, or some other count of sample values in a bin. Thus, the decision logic (410) can skip over a bin that includes only a few sample values (has less than the threshold count), which might be due to camera error or might otherwise not be worth depicting at full brightness. Alternatively, to determine the brightness level of the target display device (490), the decision logic (410) is configured to select a highest bin, among multiple bins of histogram information, that includes at least one of the sample values of the picture of HDR video, then set the brightness level of the target display device (490) based at least in part on the selected bin. Typically, the decision logic (410) sets the brightness level based on the maximum possible sample value for the selected bin. Alternatively, however, the decision logic (410) can set the brightness level based on the average possible sample value for the selected bin, the highest actual sample value in the selected bin, or some other factor. The decision logic (410) can also consider characteristics of the target display device (490) (e.g., peak brightness) and/or other information when determining the brightness level of the target display device (490). In scenarios in which the target display device (490) is connected to the video playback system (401) for immediate playback, the decision logic (410) is further configured to send, to the target display device (490), a control signal (416) that indicates the brightness level of the target display device (490). The control signal (416) can indicate the brightness level as a percentage of a peak brightness of the target display device (490), as an absolute brightness level (in nits), as a relative level (e.g., on a scale of 1 to 10), or in some other way. On the other hand, in scenarios in which the target display device (490) is not connected to the video playback system (401), or in scenarios in which the brightness level is queued for later playback, the decision logic (410) is further configured to buffer an indication of the brightness level of the target display device (490). The indication of the brightness level can be paired with the sample values (452) of the picture of HDR content and/or with encoded data (432) for the picture of HDR content, which associates the brightness level with the picture of HDR content for later playback operations.

The decision logic (410) can consider various other information when setting the brightness level. For example, after selecting a highest bin of histogram information, the decision logic (410) can consider counts of sample values in one or more other bins that are lower than the selected bin when setting the brightness level. Section VI further describes operations that can be performed when setting the brightness level of the target display device (490).

In some example implementations, the target display device (490) has a single backlight. In this case, the control signal (416) indicates the brightness level of the single backlight of the target display device (490). In other example implementations, the target display device (490) has multiple backlights. The summary information (454) can be organized by regions that correspond to zones associated with the multiple backlights, respectively. In this case, the control signal (416) indicates the brightness level of one of the multiple backlights of the target display device (490).

In some example implementations, brightness levels for pictures of HDR video are determined as the pictures are decoded, and the brightness levels are queued (buffered) for later use in controlling the target display device (490). For example, if the video playback system (401) quickly decodes a batch of pictures of HDR video then deactivates decoding resources (as described in section VIII), the decision logic (410) can determine brightness levels that are appropriate for the respective pictures of HDR video and buffer the brightness levels. As the pictures of HDR video are successively rendered for display, the decision logic (410) can send a control signal (416) that indicates the appropriate brightness level.

The decision logic (410) is also configured to set a tone mapping function (414) to be used by the tone mapper (470) in order to, at least in part, compensate for a change, if any, in the brightness level of the target display device (490). The decision logic (410) can be configured to set the tone mapping function (414) based at least in part on the summary information (454) for the sample values of the picture of HDR video. The decision logic (410) is configured to send the tone mapping function (414) to the tone mapper (470).

For example, to set the tone mapping function (414), the decision logic (410) is configured to select a highest bin, among multiple bins of histogram information, that satisfies a threshold count (e.g., has at least the threshold count of the sample values of the picture of HDR video). The threshold count depends on implementation and can be 10, 20, 50, or some other count of sample values. The decision logic (410) is further configured to set a maximum point of the tone mapping function (414) based at least in part on the selected bin. Typically, the decision logic (410) sets the maximum point of the tone mapping function (414) based on the maximum possible sample value for the selected bin. Alternatively, however, the decision logic (410) can set the maximum point of the tone mapping function (414) based on the average possible sample value for the selected bin, the highest actual sample value in the selected bin, or some other factor.

To set the tone mapping function (414), the decision logic (410) can be configured to select the tone mapping function (414) from among multiple available tone mapping functions based at least in part on the summary information (454), then determine parameters of the selected tone mapping function (414). The decision logic (410) can consider various other information when setting the tone mapping function (414), for example, peak brightness of the target display device (490) and/or an indication of ambient light in an environment around the target display device (490). Section VII.D describes examples of available tone mapping functions and their parameters.

In example implementations in which the target display device (490) has a single backlight, the decision logic (410) sets a single tone mapping function (414) for the tone mapper (470) to use. In example implementations in which the target display device (490) has multiple backlights, and the summary information (454) is organized by regions that correspond to zones associated with the multiple backlights, respectively, the tone mapping function (414) can be for one zone. The decision logic (414) can set a different tone mapping function (414) per zone of target display device (490).

In scenarios in which the target display device (490) is connected to the video playback system (401) for immediate playback, the video playback system (401) can apply tone mapping to input values for the sample values (452) of the picture of HDR content, according to the tone mapping function (414), and thereby produce output values. On the other hand, in scenarios in which the target display device (490) is not connected to the video playback system (401), or in scenarios in which the tone mapping function is queued for later playback, the decision logic (410) is further configured to buffer parameters of the tone mapping function. The parameters of the tone mapping function can be paired with the sample values (452) of the picture of HDR content and/or with encoded data (432) for the picture of HDR content, which associates the tone mapping function with the picture of HDR content for later playback operations. For example, in some example implementations, tone mapping functions for pictures of HDR video are determined as the pictures are decoded, and the tone mapping functions are queued for later use by the tone mapper (470). For example, if the video playback system (401) quickly decodes a batch of pictures of HDR video then deactivates decoding resources (as described in section VIII), the decision logic (410) can determine tone mapping functions that are appropriate for the respective pictures of HDR video and buffer parameters for the tone mapping functions. Brightness levels that match the tone mapping functions can also be buffered in association with the respective tone mapping functions. As the pictures of HDR video are successively rendered for display, the decision logic (410) can send the appropriate tone mapping function(s) to the tone mapper (470).

The decision logic (410) can consider various other factors when making decisions about rendering. For example, the decision logic (410) can be configured to determine a proportion of the screen area of the target display device (490) that is to be used for video rendering (e.g., full screen or some tile less than full screen). An indication of the proportion of the screen area that is to be used for video rendering can be reported as one of the settings (408) from the data store (406). When a tile that includes only a portion (less than all) of the screen area is used for rendering of the HDR video, the decision logic (410) can be further configured to receive summary information for sample values of each of one or more other tiles of the screen area, which can represent a desktop background, application content, a text overlay, a graphical overlay, and/or other content. While accounting for how the picture of HDR video and other content will be composited for rendering, the decision logic (410) can merge the summary information (454) for the sample values of the picture of HDR video and the summary information for the sample values of the other tile(s) of the screen area. At this point, the decision logic (410) can use the merged summary information to set the brightness level of the target display device (490) and/or set the tone mapping function (414) to be used by the tone mapper (470). Thus, the brightness level of the target display device (490) and/or the tone mapping function (414) can be determined based at least in part on the summary information for the other tile(s) of the screen area.

As another example, the decision logic (410) can be configured to determine whether the brightness level of the target display device (490) can be programmatically controlled using a control signal (416). An indication of whether the brightness level of the target display device (490) can be programmatically controlled can be reported as one of the settings (408) from the data store (406). As another example, the decision logic (410) can be configured to determine whether the target display device (490) is in a power-saving mode. An indication of whether the target display device (490) is in a power-saving mode can be reported as one of the settings (408) from the data store (406). The decision logic (410) can determine whether to adjust the brightness level of the target display device (490) based at least in part on whether the brightness level of the target display device (490) can be programmatically controlled and/or whether the target display device (490) is in a power-saving mode. The decision logic (410) can also set the tone mapping function (414) to be used by the tone mapper (470) based at least in part on whether the brightness level of the target display device (490) can be programmatically controlled and/or whether the target display device (490) is in a power-saving mode.

The decision logic (410) also sends a decision (412) to the streaming controller (420) about encoded data to request. In the scenario of FIG. 4a, the decision logic (410) instructs the streaming controller (420) to request HDR video.

The streaming controller (420) is configured to request encoded data for pictures of HDR video when so instructed by the decision logic (410). If the target display device (490) is limited to SDR (e.g., due to a low peak brightness, or use of power-saving mode), the streaming controller (420) can request encoded data for SDR video. Depending on the scenario, the streaming controller (420) can send a request for encoded data to the media server (430) or a media store (431). In the scenario shown in FIG. 4a, the streaming controller (420) sends a request (422) for HDR video.

The media server (430) can be a Web server or other server, connected over a network, that stores encoded data for video and streams it to client systems for playback. The media server (430) can store encoded data for HDR video as well as encoded data for SDR video. In the scenario shown in FIG. 4a, the media server (430) streams encoded data (432) for HDR video to the video playback system (401). In other scenarios, the media server (430) may stream encoded data (432) for SDR video to the video playback system (401).

If a media server (430) is not used, the video playback system (401) can retrieve encoded data from a media store (431). The media store (431) can be a magnetic disk, optical storage media, non-volatile memory, or other storage or memory, connected locally to the video playback system (401), that stores encoded data for video and sends it to the video playback system (401) for playback. The media store (431) can store encoded data for HDR video as well as encoded data for SDR video. Depending on the scenario, the media store (431) may send encoded data for HDR video or encoded data for SDR video to the video playback system (401).

The input buffer (440) is configured to store the encoded data. The input buffer (440) sends encoded data (e.g., encoded data (432) for HDR video) to the video decoder (450). The video decoder is (450) configured to decode the encoded data, thereby producing sample values of video. In FIG. 4a, the video decoder decodes the encoded data (432) for a picture of HDR video and produces sample values (452) of the picture of HDR video. In other scenarios, the video decoder (450) decodes encoded data for SDR video and produces sample values of pictures of SDR video. Depending on implementation and the format of the encoded data, the video decoder (450) can decode the encoded data in a manner consistent with the H.265/HEVC standard, ISO/IEC 14496-10 standard (also known as H.264/AVC), another standard, or a proprietary format such as VP8 or VP9, or a variation or extension thereof.

The video decoder (450) (or another module) can also send metadata for the decoded video (e.g., summary information (454) for HDR video in FIG. 4a) to the decision logic (410) and/or the tone mapper (470). In the example of FIG. 4a, the video decoder is configured to compute the summary information (454) from the sample values (452) of the picture of HDR video, then send the summary information (454) to the decision logic (410).

The sample values (452) of HDR video are, for example, sample values in HDR-10 format. In this case, the sample values (452) are 10-bit sample values in a YUV-type color space, with a chroma sampling rate of 4:2:0. Alternatively, the sample values output by the video decoder (450) are in another format.

The color converter (460) is configured to convert sample values of decoded video from an initial color space to an intermediate color space. In particular, as pre-processing before tone mapping, the color converter (460) is configured to convert the sample values (452) of the picture of HDR video from an initial color space to an intermediate color space, thereby producing intensity values and color values in the intermediate color space. Before color space conversion or as part of color space conversion, the color converter (460) may perform chroma sample rate upsampling, to restore chroma sample values to have the same resolution as luma sample values in the decoded video.

The initial color space can be a YUV-type color space, and the intermediate color space can be a perceptually uniform, hue linear color space such as IPT. For example, YUV sample values for HDR video, which are output from the video decoder (450), are converted (after or in conjunction with chroma sample rate upsampling) to sample values in an RGB-type color space. The values can be linearized to nits. The sample values in the RGB-type color space are converted to sample values in XYZ color space (as defined in CIE 1931). The sample values in XYZ color space are converted to sample values in the IPT color space. This can involve a transform to LMS values, which are adjusted and transformed to the IPT color space. The IPT color space is an example of a perceptually uniform (or hue linear) color space, in which sample values include intensity (I) values and color values, with one color value (P) representing a value along a red-green dimension, and the other color value (T) representing a value along a yellow-blue dimension. For tone mapping, the intensity (I) values are tone mapped. The color converter (460) sends the intensity values in the intermediate color space as input values to the tone mapper (470), such that the output values from the tone mapper (470) are tone-mapped intensity values in the intermediate color space. The color (P, T) values in the intermediate color space are not tone mapped, but they may be adjusted to compensate for loss of detail (perceptually) introduced by tone mapping, as explained below.

The tone mapper (470) is configured to apply tone mapping to input values for the sample values of decoded video (e.g., for a picture of HDR video), according to the tone mapping function (414), producing output values. Depending on the scenario, the tone mapper (470) can produce output values for sample values of HDR video, EDR video, or SDR video. When the input values to the tone mapper (470) are intensity values (462) for HDR video in an intermediate color space, produced by the color converter (460), the output values from the tone mapper are tone-mapped intensity values (472) in the intermediate color space.

The tone mapper (470) can be configured to apply tone mapping on a region-by-region basis within a picture. For example, the tone mapper (470) uses a tone mapping function that varies from region-to-region within a picture, depending on the content of the picture, or even skips tone mapping for some regions of the picture. Or, the tone mapper (470) can be configured to apply tone mapping throughout a picture.

The tone mapper (470) can also be configured to adjust at least some of the color values (in the intermediate color space). Although I, P and T values are decorrelated, boosting of intensity values during tone mapping may cause "whitening" (desaturation). The perceived desaturation can make colors appear less vivid and make small differences between certain colors (e.g., light bluish colors) more difficult to perceive. To compensate for this, P and T values may be selectively adjusted, depending on hue. For example, for all hues, P and T values are saturated, but P and T values for some hues (e.g., bluish hues) are saturated more aggressively. Otherwise, the colors for those hues are too dull (e.g., significantly light blue colors are likely to be perceived as white colors). Alternatively, P and T values for some hues (e.g., bluish hues) are saturated, while P and T values for other hues are not adjusted at all. In some example implementations, P and T values are selectively adjusted depending on the ratio of original intensity value ($I_{input}$) to tone-mapped intensity value ($I_{TM}$). This increases selected P and T values in order to make colors more vivid (saturated). Other color values can be passed through without adjustment.

The color converter (480) is configured to convert the tone-mapped intensity values (472) and color values (possible adjusted) in the intermediate color space, from the intermediate color space to a final color space for the sample values (482). For example, the final color space is an RGB-type color space specific to the target display device (490).

FIG. 4b shows a second example architecture for rendering of video on a target display device (490). In addition to the target display device (490) and media server (430), the example architecture of FIG. 4b includes a video playback system (402) connected to the target display device (490) and connected to the media server (430). The video playback system (402) shown in FIG. 4b is identical to the video playback system (401) shown in FIG. 4a, except as follows. The video playback system (402) includes a digital signal processor ("DSP") (455) or other module that is configured to receive sample values (452) of HDR video from the video decoder (450), compute summary information (454) from the sample values (452) of a picture of HDR video, and send the summary information (454) to the decision logic (410). Thus, the video playback system (402) of FIG. 4b includes a different way for the summary information (454) to be determined and sent to the decision logic (410).

In FIGS. 4a and 4b, summary information (454) (e.g., histogram information) is locally generated at the video playback system (401, 402) from the sample values (452) of pictures of HDR video. Alternatively, the decision logic (410) can be configured to receive metadata including the summary information (454) from a metadata extractor, which receives the metadata from a metadata source such as the media server (430) or media store (431) and generates the summary information (454) from the metadata. FIG. 4c shows a third example architecture for rendering of video on a target display device (490). In addition to the target display device (490) and media server (430), the example architecture of FIG. 4c includes a video playback system (403) connected to the target display device (490) and connected to the media server (430). The video playback system (403) shown in FIG. 4c is identical to the video playback system (401) shown in FIG. 4a, except as follows. The encoded data (432) for HDR video contains metadata, including metadata indicating the summary information (454). A metadata extractor (445) is configured to receive the encoded data (432) and extract metadata, including the summary information (454), from the encoded data. The metadata extractor (445) is configured to send remaining encoded data (448) to the video decoder (450) and send the summary information (454) to the decision logic (410).

In the video playback system (401, 402, 403), the decision logic (410), tone mapper (470), and color converters (460, 480) can be organized as modules of a renderer. More generally, depending on implementation and the type of processing desired, modules of the video playback system (401, 402, 403) can be added, omitted, split into multiple modules, combined with other modules, and/or replaced with like modules. In alternative embodiments, video playback systems with different modules and/or other configurations of modules perform one or more of the described techniques. Specific embodiments of video playback systems typically use a variation or supplemented version of the video playback system (401, 402, 403). The relationships shown between modules within the video playback system (401, 402, 403) indicate general flows of information in the video playback system (401, 402, 403); other relationships are not shown for the sake of simplicity. In general, a given module of the video playback system (401, 402, 403) can be implemented by software executable on a CPU, by software controlling special-purpose hardware (e.g., a GPU or other graphics hardware for video acceleration), or by special-purpose hardware (e.g., in an ASIC). In particular, in some example implementations, tone mapping operations are performed using a general-purpose GPU (e.g., with shader instructions), and the decision logic (410) is implemented in software executable on a CPU.

V. Example Summary Information.

This section describes examples of summary information. Specifically, this section describes many examples of histogram information, which is information that indicates a distribution of sample values, organized by bins for different ranges of possible sample values. Histogram information for sample values of a picture of HDR content is organized as multiple bins. Each of the bins represents a range of possible sample values between a minimum possible sample value for the bin and a maximum possible sample value for the bin. Each of the bins can have a count of the sample values of the picture of HDR content within that bin, or some other indicator of a proportion of the sample values of the picture of HDR content within the bin. Histogram information can indicate various characteristics of sample values of a picture of HDR content, which can be considered by a playback system when setting the brightness level of a target display device and/or setting a tone mapping function to be used in tone mapping operations. For example, the playback system can use the distribution of dark sample values and mid-range sample values to regulate tone mapping operations, and thereby improve quality. As another example, the playback system can use the distribution of bright sample values to control the brightness level of a target display device, and thereby reduce power consumption.

Figure 5B:
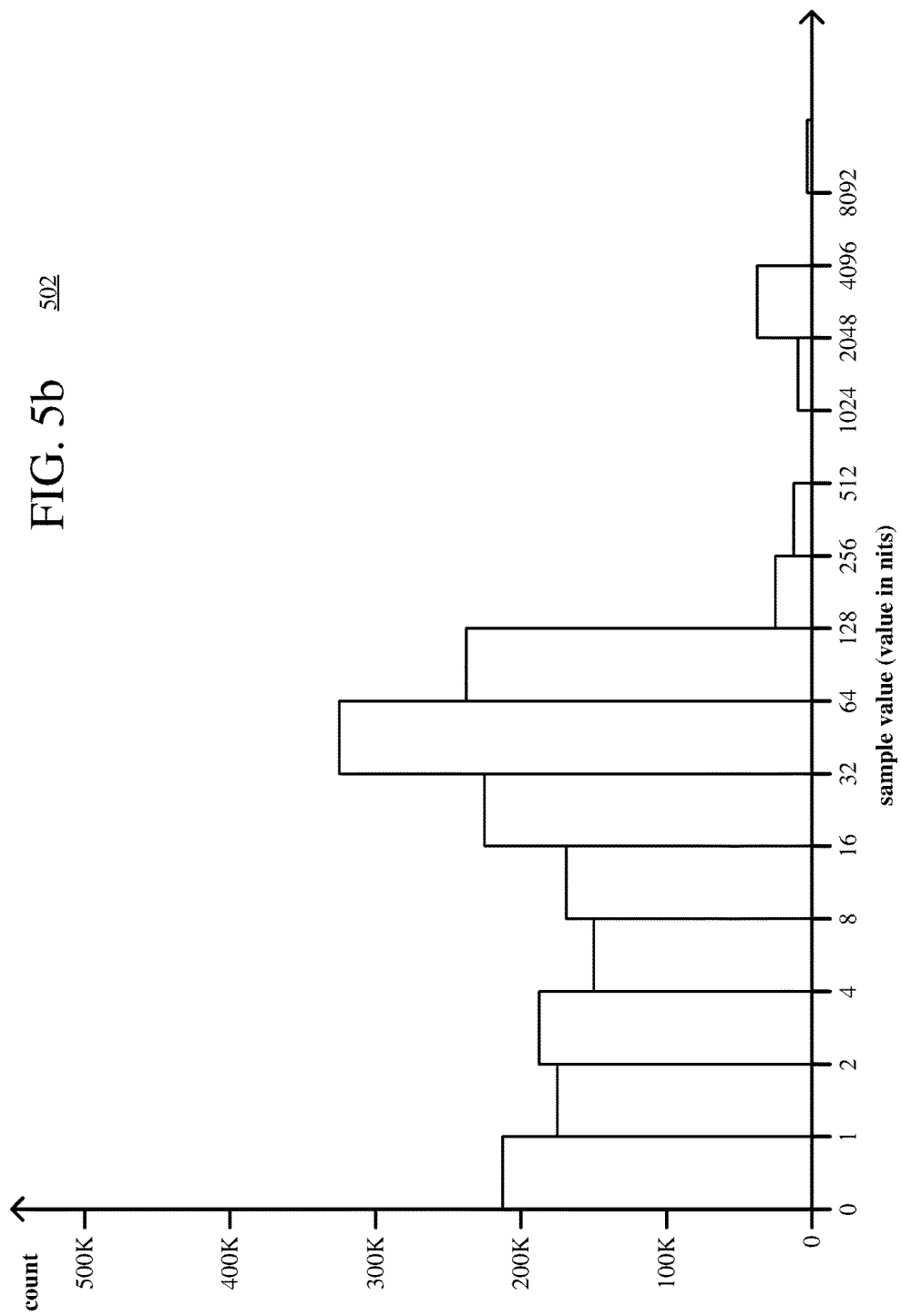

In histogram information, bins can have uniform size in terms of the range of possible sample values in the bins, respectively. FIG. 5a shows an example (501) of histogram information in which bins have uniform size. In FIG. 5a, the vertical axis indicates a count of sample values per bin. The horizontal axis indicates brightness values in terms of nits, starting from 0 nits and continuing to a peak brightness of 10000 nits. For a different HDR format, the overall range of possible sample values may be different (e.g., 4000 nits, 1500 nits). Also, instead of indicating possible sample values in terms of absolute values (nits), the horizontal axis can indicate possible sample values in relative terms (e.g., percent of a peak brightness value).

In FIG. 5a, each of the bins includes a range of 250 possible sample values. Alternatively, the bins can have another size (e.g., 100 possible sample values, 1,000 possible sample values), which results in more bins or fewer bins. In any case, if bins are uniformly sized in terms of the range of nits per bin, the lowest bin typically includes the vast majority of sample values, even for a picture with bright highlights. In the example (501) of FIG. 5a, sample values of a picture of HDR content include many bright highlights. Even so, the bin that represents sample values in the range of 0<=x<250 nits includes almost all of the sample values. Two bins in the range of 3500<=x<3750 and 3750<=x<4000, respectively, include significant counts of sample values (several thousand) representing bright highlights. Several other bins (250<=x<500, 500<=x<750, 750<=x<1000, 1000<=x<1250) also represent bright sample values.

To provide distribution information that tends to be more even, the bins of the histogram information can have variable size in terms of the range of possible sample values in the bins, respectively (range of nits per bin). For example, the sizes of the bins can be perceptually weighted and define steps that are at least approximately uniform (perceptually). In general, the bins are narrower (more fine-grained) for dark sample values and successively wider for brighter sample values. In some example implementations, the sizes of the bins increase, for at least some of the bins, by a factor of 2 between bins. Thus, the sizes are, at least approximately, a function of logarithm base 2 of possible sample values in the bins, respectively (in terms of range of nits per bin). In the example (502) of FIG. 5b, the peak brightness is 10000 nits. The bins for possible sample values are:

bin 0: 0 nits<=x<=1 nit
bin 1: 1 nit<x<=2 nits
bin 2: 2 nits<x<=4 nits
bin 3: 4 nits<x<=8 nits
bin 4: 8 nits<x<=16 nits
bin 5: 16 nits<x<=32 nits
bin 6: 32 nits<x<=64 nits
bin 7: 64 nits<x<=128 nits
bin 8: 128 nits<x<=256 nits
bin 9: 256 nits<x<=512 nits
bin 10: 512 nits<x<=1024 nits
bin 11: 1024 nits<x<=2048 nits
bin 12: 2048 nits<x<=4096 nits
bin 13: 4096 nits<x<=8192 nits
bin 14: 8192 nits<x For any sample value x (in nits) that is at least 1, the bin for the sample value can be computed as ceil($\log_2(x)$), where ceil(a) rounds a up to the nearest integer. For any sample value x (in nits) less than 1, the bin is bin 0. More compactly, the bin for any sample value x greater than 0 can be computed as max(0, ceil($\log_2(x)$)), where max(a, b) returns the higher of a and b.

FIG. 5c shows an example (503) of histogram information directly calculated from 10-bit luma sample values, which represent values in nits after application of an OETF such as the OETF (310) of FIG. 3. In the example (503) of FIG. 5c, the bins of the histogram information have uniform size in terms of the range of possible sample values in the bins, respectively, but in effect represent variable-size ranges of values of nits. Specifically, in the example (503) of FIG. 5c, the bins for possible sample values are:

bin 0: 0<=x<64
bin 1: 64<=x<128
bin 2: 128<=x<192
bin 3: 192<=x<256
bin 4: 256<=x<320
bin 5: 320<=x<384
bin 6: 384<=x<448
bin 7: 448<=x<512
bin 8: 512<=x<576
bin 9: 576<=x<640
bin 10: 640<=x<704
bin 11: 704<=x<768
bin 12: 768<=x<832
bin 13: 832<=x<896
bin 14: 896<=x<960
bin 15: 960<=x<1024

The bin for any luma sample value x can be computed as x>>6, where >> represents a right bit shift operation. Alternatively, the bins can have another size (e.g., 32 possible sample values, 128 possible sample values), which results in more bins or fewer bins. In the example (503) of FIG. 5c, sample values of a picture include many bright highlights, which are counted for bins 11 and 12. Bin 15 includes a small number of very bright sample values. The lower bins include significant numbers of dark sample values and mid-range sample values.

If sample values are gamma-encoded before encoding, sample values are boosted, especially dark sample values and mid-range sample values in order to devote more bits to gradations in perceptually important values. Gamma-encoding tends to cause histogram information to "shift" to the right and flatten for low-range bins and mid-range bins.

Bin sizes can be fixed for all pictures of HDR content. Or, bin sizes can vary from picture to picture.

Alternatively, the summary information for a picture of HDR content can be a minimum sample value and maximum sample value for the picture of HDR content. Or, the summary information for a picture of HDR content can be a percentage of sample values of a picture of HDR content per bin, where sizes of bins are set using one of the options described above. Alternatively, the summary information is parameterized in some other way.

As explained with reference to FIGS. 4a-4c, summary information can be provided by various sources, depending on implementation. Summary information can be provided as part of metadata in a container format file or stream from a media server or other media source. A metadata extractor can parse such metadata in order to generate summary information. Alternatively, summary information can be generated by a module at a playback system, which computes the summary information by analysis of the sample values of a picture of HDR content.

For example, a 2D DSP can generate histogram information or other summary information from sample values of a picture of HDR content, using efficient, fixed-function logic. A 2D DSP is a DSP adapted to perform operations on image data or other data organized in two dimensions. In a gaming scenario or other rendering scenario, a compositor can accept sample values of a picture of HDR content, calculate histogram information or other summary information, and output the summary information. As further explained below, summary information can be computed for different tiles of sample values buffered in a cache.

Or, as another example, a 3D DSP or general-purpose CPU can generate histogram information or other summary information from sample values of a picture of HDR content, which is typically less efficient than using a 2D DSP. A 3D DSP is a DSP adapted to perform operations on volume data or other data organized in three dimensions.

Or, as another example, a video decoder can generate histogram information or other summary information when processing sample values of a picture of HDR content for output. Typically, reconstructed sample values are organized in a left-to-right, top-to-bottom pattern. When traversing sample values of a reconstructed picture as the sample values are written to a buffer for output, the video decoder can quickly accumulate histogram information for the sample values or otherwise track parameters used for summary information. In some example implementations, a video decoder can generate histogram information without needing an additional decoding pass or stage, and without needing significant additional storage or buffers (only count values for bins are tracked).

Histogram information or other summary information can be computed from sample values of a picture of HDR content in a YUV-type color space (specifically, from luma sample values in a YUV-type color space). Alternatively, histogram information or other summary information can be computed from sample values of a picture of HDR content in another color space such as IPT (specifically, from brightness sample values or intensity values in the other color space).

In some scenarios, all of the screen area of a target display device is used to render HDR content. Histogram information or other summary information for sample values of a picture of HDR content can be used to control the brightness level of the target display device, regulating the brightness level of the entire screen area, and to control the tone mapping function used in tone mapping operations.

In other scenarios, a tile that includes only a portion (less than all) of the screen area of a target display device is used to render HDR video, but the brightness level is set for the entire screen area of the target display device. This means the display of content in other tiles of the screen area may be affected by changing the brightness level. The other tiles can depict text for sub-titles, a graphical overlay, user interface controls for playback, application content, a desktop background, or other content. Summary information (e.g., histogram information) from different tiles of the screen area can be merged. For example, as shown in the example technique (600) of FIG. 6, a module of the playback system receives (610) summary information for sample values of a picture of HDR video in one tile of a screen area of a target display device. The module of the playback system also receives (620) summary information for sample values of each of one or more other tiles of the screen area, then merges (630) the summary information for the sample values of the picture of HDR video and the summary information for the sample values of the other tile(s) of the screen area. The playback system can then set the brightness level of the target display device and/or set a tone mapping function using the merged summary information. Alternatively, the playback system can separately evaluate summary information for different tiles of the screen area when setting the brightness level of a target display device and/or setting a tone mapping function. In any case, the brightness level of a target display device and tone mapping function, affecting sample values in an entire screen area, can be determined based at least in part on the summary information for a portion in which HDR video is rendered as well as summary information for the other tile(s) of the screen area.

VI. Example Content-Adaptive Adjustments to Brightness Levels.

In some previous approaches, the brightness level of a display device changes in reaction to the sample values of a picture of HDR content, after the picture has been displayed. Thus, the brightness level of the display device when rendering a current picture depends on the characteristics of one or more previous pictures. So long as the characteristics of HDR content change slowly from picture to picture, the brightness level of the display device is, at least approximately, appropriate. If the characteristics of HDR content change abruptly, however, the brightness level may overshoot or undershoot the appropriate level. For example, when a first dark picture is rendered after one or more bright pictures in a video sequence, the brightness level of the display device may overshoot the appropriate level, resulting in display of the dark picture that is too bright (or too gray), not black enough, etc., and also consuming power unnecessarily. As another example, when a first bright picture is rendered after one or more dark pictures in a video sequence, the brightness level of the display device may undershoot the appropriate level, resulting in display of the bright picture that is too dark, with bright highlights lost. Thus, in previous approaches that employ a feedback loop between a display device and playback system, the feedback loop may cause quality degradation and excess power consumption due to incoherent processing and/or lagging control over the brightness level of the display device.

This section describes various approaches to content-adaptive adjustment to the brightness level of a target display device when rendering HDR content. The target display device can be connected to a playback system, in which case the brightness level of the target display device can be immediately adjusted when rendering the HDR content. Or, the brightness level can be buffered for use in later playback of the HDR content. Regardless, a playback system can proactively and dynamically control the brightness level of a target display device for rendering of a picture of HDR content based on summary information for sample values of the picture of HDR content. In this way, the playback system can "push" control signals to a target display device to proactively control the brightness level of the target display device.

Content-adaptive adjustment of the brightness level of a target display device can be used in various scenarios. For example, the playback system can be a video playback system that is part of a set-top box, media player, or game console, with summary information generated by a video decoder, metadata extractor, or other source. Or, the playback system can be part of a transcoding system, which decodes HDR content before re-encoding it, with summary information generated by a video decoder, metadata extractor, or other source. Or, the playback system can be part of a game console that renders HDR content for a game, with summary information generated by a 2D DSP and the game console adjusting brightness level to reduce power consumption. Or, the playback system can be part of system that composites various types of information inside a buffer for different tiles (for windows, overlays, etc.) of a screen area. The different tiles of the screen area can include a tile for desktop background content, a tile for application content, a tile for sample values of a picture of HDR video, a tile for sample values of a text overlay and/or graphical overlay, and/or other tiles. A compositor can composite content for the respective tiles in the buffer. With a 2D DSP or other module, the playback system can generate summary information for the sample values of the respective tiles in the buffer. The playback system can merge the summary information for the respective tiles, then use the merged summary information to determine the brightness level of a target display device. In this way, the content of a desktop background, application content in one or more different windows, pictures of HDR video, sub-titles, controls for playback, etc. can be analyzed and merged for brightness control.

Using any of the techniques described in this section, based on summary information for sample values of a picture of HDR content, a playback system can adjust the brightness level of a single backlight of a target display device. For example, the target display device can be an LCD device that has a single backlight. Alternatively, based on summary information for sample values of a picture of HDR content, a playback system can adjust the brightness level of one of multiple backlights of a target display device. For example, the target display device has multiple backlights in different zones, with a backlight associated with each of the zones. In this case, the summary information can be organized by zone, and the playback system can determine a brightness level per zone.

Thus, the playback system can reduce power consumption by the backlight of the target display device in many scenarios by lowering the brightness level of the target display device, without hurting quality, or even improving quality. For example, if the brightest sample value is one half of the peak brightness of the target display device, the playback system can reduce the brightness level by half and double the intensity values (or luma sample values) for the sample values of the picture of HDR content. The playback system can also use the available granularity of output intensity values (or luma sample values) within the new range to reduce banding artifacts between regions of uniform sample values.

A. Content-Adaptive Adjustment of Brightness Level Using Histogram Information.

Figure 7:
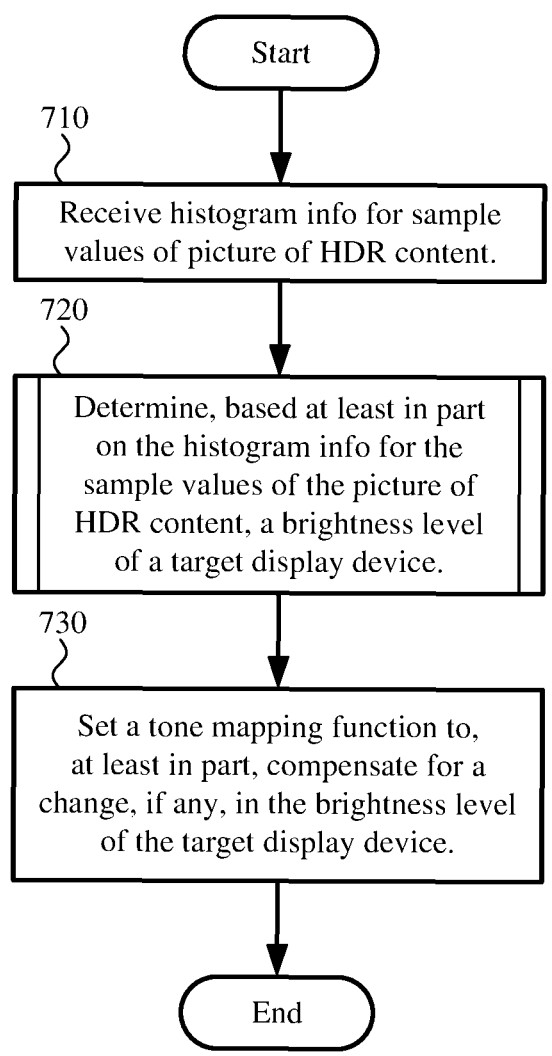
FIG. 7 is a flowchart illustrating an example technique for content-adaptive adjustment of the brightness level of a target display device using histogram information, for rendering HDR content.

FIG. 7 shows an example technique (700) for content-adaptive adjustment of the brightness level of a target display device using histogram information, for rendering HDR content. A playback system such as the video playback system (401, 402, 403) shown in FIGS. 4a-4c, or other playback system, can perform the technique (700).

A module of the playback system receives (710) histogram information for sample values of a picture of HDR content. For example, the histogram information is organized as described in section V. Alternatively, the histogram information is organized in some other way. Depending on implementation, the playback system can receive the histogram information from a metadata extractor, video decoder, or other module.

The playback system determines (720), based at least in part on the histogram information for the sample values of the picture of HDR content, a brightness level of a target display device. In general, depending on the distribution of the bright sample values in the histogram information, the playback system sets the brightness level of the target display device. For a typical picture of HDR content with bright highlights, there are many dark sample values and mid-range sample values, not very many moderately bright sample values, and a bunch of very bright sample values. The playback system can choose the "best" brightness level of the target display device in a way that trades off power consumption and quality.

FIG. 8a shows an example technique (801) for determining the brightness level of a target display device based on histogram information for sample values of a picture of HDR content. The playback system sets (810) a threshold count and sets (820) a bin of the histogram information to evaluate. The playback system evaluates bins of the histogram information starting from the bin for the highest sample values and continuing, bin-after-bin, to the bin with the next highest sample values.

The playback system checks (840) if the count of sample values for the current bin satisfies the threshold count. (Depending on implementation, the count of sample values for the current bin can satisfy the threshold count if it is greater than the threshold count, or if it is greater than or equal to the threshold count.) If the count of sample values for the current bin does not satisfy the threshold count, the playback system sets (820) the next bin of histogram information to evaluate. Otherwise (the count does satisfy the threshold count), the playback system selects (850) the current bin. In this way, the playback system selects a highest bin, among the multiple bins of the histogram information, that satisfies the threshold count of the sample values of the picture of HDR content.

The playback system sets (860) the brightness level of the target display device based at least in part on the selected bin. For example, the playback system sets the brightness level based on the maximum possible sample value for the selected bin. Or, the playback system sets the brightness level based on the actual maximum sample value in the selected bin. The playback system can consider other information when setting the brightness level of the target display device. In particular, the brightness level of the target display device can also be based at least in part on counts of sample values in one or more other bins, among the multiple bins, that are lower than the selected bin. For example, the playback system can consider whether one or more bins just below the selected bin are empty or nearly empty and, if so, set the brightness level based on a sample value of the selected highest bin. This might be done to emphasize very bright highlights in an otherwise dark scene. On the other hand, if the bin(s) just below the selected bin have a very large count of sample values, the playback system can lower the brightness level. This might be done if very bright highlights would be lost in an otherwise bright scene.

With reference to FIG. 8a, if the number of sample values in the bin for brightest sample values does not satisfy the threshold count (e.g., is less than the threshold count), the brightest sample values can be ignored by setting a lower brightness level of the target display device. In this case, the highlights for the brightest sample values will be lost, hurting quality, but power consumption is reduced. In the example (502) of FIG. 5b and example (503) of FIG. 5c, for example, the highest bin includes a very small count of sample values, which might be attributable to camera defects or other errors. If the count for the highest bin is less than the threshold count, the highest bin is skipped and the brightest sample values (in the highest bin) will not be rendered at full brightness.

More generally, to favor reduction in power consumption over preservation of quality, the threshold count is set to a high value (e.g., 20, 30, or 50). For a more balanced tradeoff between reduction in power consumption and preservation of quality, the threshold count is set to a medium value (e.g., 4, 8, or 10). To favor preservation of quality over reduction in power consumption, the threshold count is set to a low value (e.g., 2) or even zero. If the threshold count is low enough, the brightness level is always set based on the bin that includes the maximum sample value among the sample values of the picture of HDR content, even if that bin includes only one sample value. In this case, the playback system can skip comparisons between the count of sample values in a bin and a threshold count. Instead, the playback system simply selects a highest bin, among the multiple bins of the histogram information, that includes at least one of the sample values of the picture of HDR content, then sets the brightness level of the target display device based at least in part on the selected bin.

In the example of FIG. 8a, the threshold count is the same for each of the bins of histogram information for the sample values of a picture of HDR content. Alternatively, the threshold count can be different for different bins. For example, the threshold count is relatively low for the bin with the highest possible sample values, but the threshold count is higher for bins with lower sample values. This means very bright highlights are likely be displayed, even if there are not that many very bright sample values. On the other hand, the brightness level is more aggressively lowered for pictures without very bright highlights.

FIG. 8*b* shows another example technique (802) for determining the brightness level of a target display device based on histogram information for sample values of a picture of HDR content. The playback system sets (820) a bin of the histogram information to evaluate. The playback system evaluates bins of the histogram information starting from the bin for the highest sample values and continuing, bin-after-bin, to the bin with the next highest sample values. For the current bin, the playback system sets (830) a threshold count. The threshold count can be different for different bins. The playback system checks (840) if the count of sample values for the current bin satisfies the threshold count for the bin. If not, the playback system sets (820) the next bin of histogram information to evaluate and sets (830) the threshold count for that bin. Otherwise (the count satisfies the threshold count), the playback system selects (850) the current bin. In this way, the playback system selects a highest bin, among the multiple bins of the histogram information, that satisfies the threshold count of the sample values for that bin. Finally, as described with reference to FIG. 8*a*, the playback system sets (860) the brightness level of the target display device based at least in part on the selected bin.

Alternatively, the playback system determines the brightness level of a target display device in some other way, based on histogram information for sample values of the picture of HDR content. Also, the playback system can consider characteristics of the target display device (e.g., peak brightness) and/or other information when determining the brightness level of the target display device.

With reference to FIG. 7, the playback system sets (730) a tone mapping function to, at least in part, compensate for a change, if any, in the brightness level of the target display device. For example, the playback system sets the tone mapping function based on the histogram information for the sample values of the picture of HDR content, as described in section VII.

If the target display device is connected to the playback system for immediate playback, the playback system can send, to the target display device, a control signal that indicates the brightness level of the target display device. The playback system applies tone mapping to input values for the sample values of the picture of HDR content, according to the tone mapping function, thereby producing output values. For example, the input values are intensity values in an intermediate color space (such as IPT or another perceptually uniform, hue linear color space), and the output values are tone-mapped intensity values. Alternatively, tone mapping can be performed on luma values in a YUV-type color space or other color space. Depending on the target display device, the output values can be for sample values of a picture of HDR content, sample values of a picture of SDR content, or sample values of a picture of EDR content. Sample values based on the tone-mapped values (e.g., after subsequent color conversion to a final color space) are sent to the target display device.

Otherwise, if the target display device is not connected to the playback system for immediate playback, the playback system can buffer an indication of the brightness level of the target display device for later playback. The indication of the brightness level can be paired with the sample values of the picture of HDR content or with encoded data for the picture of HDR content. Parameters for a tone mapping function that matches the brightness level can be buffered in association with the indication of the brightness level.

B. Content-Adaptive Adjustment of Brightness Level Using Locally-Generated Summary Information.

FIG. 9 shows a generalized technique (900) for content-adaptive adjustment of the brightness level of a target display device using locally-generated summary information, for rendering HDR content. A playback system such as the video playback system (401, 402, 403) shown in FIGS. 4*a*-4*c*, or other playback system, can perform the technique (900).

The playback system produces (910) sample values of a picture of HDR content. For example, a video decoder of the playback system decodes encoded data for the picture of HDR content, thereby producing the sample values. Or, a game console produces the sample values when rendering HDR content for a game. Or, the sample values are produced in some other way.

In any case, from the sample values of the picture of HDR content, the playback system generates (920) summary information for the sample values of the picture of HDR content. For example, the summary information is histogram information organized as described in section V. Alternatively, the playback system generates some other type of summary information. Depending on implementation, a video decoder or other module (such as a 2D DSP, 3D DSP, or software module executing on a CPU) can compute the summary information from the sample values of the picture of HDR content.

The playback system determines (930), based at least in part on the summary information for the sample values of the picture of HDR content, a brightness level of a target display device. For example, if the summary information is histogram information, the playback system determines the brightness level as described with reference to FIG. 7. Or, if the summary information includes a maximum sample value, the playback system can set the brightness level to be the maximum sample value. Alternatively, the playback system can set the brightness level of the target display device in some other way. The playback system can consider characteristics of the target display device (e.g., peak brightness) and/or other information when determining the brightness level of the target display device.

The playback system sets (940) a tone mapping function to, at least in part, compensate for a change, if any, in the brightness level of the target display device. For example, the playback system sets the tone mapping function based on the summary information for the sample values of the picture of HDR content, as described in section VII.

If the target display device is connected to the playback system for immediate playback, the playback system can send, to the target display device, a control signal that indicates the brightness level of the target display device. In this case, the playback system applies tone mapping to input values for the sample values of the picture of HDR content, according to the tone mapping function, thereby producing output values. Otherwise, if the target display device is not connected to the playback system for immediate playback, the playback system can buffer an indication of the brightness level of the target display device for later playback. The indication of the brightness level can be paired with the sample values of the picture of HDR content or with encoded data for the picture of HDR content. Parameters for a tone mapping function that matches the brightness level can be buffered in association with the indication of the brightness level.

C. Pairing Brightness Levels With Pictures of HDR Content for Later Playback.

FIG. 10 shows an example technique (1000) for associating brightness levels of a target display device with corresponding pictures of HDR content, for later playback of the pictures of HDR content. A playback system such as the video playback system (401, 402, 403) shown in FIGS. 4a-4c, or other playback system, can perform the technique (1000).

The playback system decodes (1010) encoded data for the picture of HDR content, thereby producing sample values of the picture of HDR content. The playback system generates (1020) summary information for the sample values of the picture of HDR content. For example, the summary information is histogram information organized as described in section V. Alternatively, the playback system generates some other type of summary information. Depending on implementation, a video decoder or other module (such as a 2D DSP, 3D DSP, or software module executing on a CPU) can compute the summary information from the sample values of the picture of HDR content. Or, a metadata extractor can parse metadata to generate the summary information.

The playback system determines (1030), based at least in part on the summary information for the sample values of the picture of HDR content, a brightness level of a target display device. For example, if the summary information is histogram information, the playback system determines the brightness level as described with reference to FIG. 7. Or, if the summary information includes a maximum sample value, the playback system can set the brightness level to be the maximum sample value. Alternatively, the playback system can set the brightness level of the target display device in some other way. The playback system can consider characteristics of the target display device (e.g., peak brightness) and/or other information when determining the brightness level of the target display device.

The playback system sets (1040) a tone mapping function that matches the brightness level, so as to, at least in part, compensate for a change, if any, in the brightness level of the target display device. For example, the playback system sets the tone mapping function based on the summary information for the sample values of the picture of HDR content, as described in section VII.

The playback system buffers (1050) an indication of the brightness level of the target display device and parameters of the tone mapping function that matches the brightness level for later playback. The indication of the brightness level and parameters of the tone mapping function are paired with the sample values of the picture of HDR content or with encoded data for the picture of HDR content.

The playback system checks (1060) whether to continue with the next picture in the video sequence. If so, the playback system decodes (1010) encoded data for the next picture of HDR content and generates (1020) summary information for the sample values of the next picture of HDR content. In this way, the playback system can buffer information about brightness levels and matching tone mapping functions for multiple pictures in a video sequence, for later playback on a target display device. The playback system can buffer such information in the context of video playback with selective deactivation of decoding resources (as described in section VIII), in the context of transcoding, or in some other context.

VII. Example Content-Adaptive Adjustments to Tone Mapping Functions.

In the absence of information about the sample values of a picture of HDR content, a playback system assumes that the sample values may include the lowest possible sample value and the highest possible sample value. That is, the playback system assumes that the dynamic range of the sample values is the full dynamic range that is possible. The brightness level of the target display device is typically set to be the peak brightness of the target display device.

This section describes approaches to content-adaptive adjustment of a tone mapping function used in tone mapping operations when rendering HDR content for a target display device. The target display device can be connected to a playback system, in which case the tone mapping function can be used in tone mapping operations immediately when rendering the HDR content. Or, information about the tone mapping function can be buffered for use in later playback of the HDR content. Regardless, a playback system can use summary information (such as histogram information) to improve the quality of tone mapping operations and/or reduce the computational load of tone mapping operations. For example, depending on the actual dynamic range of the sample values of a picture of HDR content, the playback system can switch to a tone mapping function that is computationally simpler and/or assign finer-grained output values only to input values in the actual dynamic range of the sample values of the picture of HDR content.

Content-adaptive adjustment of a tone mapping function can be used in various scenarios. For example, the playback system can be a video playback system that is part of a set-top box, media player, or game console, with summary information provided by a video decoder or other source. Or, the playback system can be part of a game console that renders HDR content for a game, with summary information provided by a 2D DSP and the game console adjusting the tone mapping function to reduce power consumption and/or improve quality. Or, the playback system can be part of system that composites various types of information inside a buffer for different tiles (for windows, overlays, etc.) of a screen area, and sets an appropriate tone mapping function or different tone mapping functions for different tiles. Or, the playback system can be part of a transcoding system, which decodes HDR video, performs tone mapping operations, and re-encodes the tone-mapped video as SDR video or EDR video for subsequent playback. The transcoding can be performed, for example, in a gameplay broadcast scenario in which HDR content is rendered locally but recorded gameplay video is transcoded to a lower dynamic range.

FIGS. 11, 13, and 14 show various approaches to setting a tone mapping function for a picture of HDR content. After setting a tone mapping function, a playback system can apply tone mapping to input values for the sample values of the picture of HDR content, according to the tone mapping function, thereby producing output values. For example, the input values are intensity values in an intermediate color space (such as IPT or another perceptually uniform, hue linear color space), and the output values are tone-mapped intensity values. Alternatively, tone mapping can be performed on luma values in a YUV-type color space or other color space. Depending on the target display device, the output values can be for sample values of a picture of HDR content, sample values of a picture of SDR content, or sample values of a picture of EDR content. Sample values based on the tone-mapped values (e.g., after subsequent color conversion to a final color space) are sent to the target display device.

A. Content-Adaptive Adjustment to Tone Mapping Functions Using Locally-Generated Summary Information.

FIG. 11 shows an example technique (1100) for content-adaptive adjustment of tone mapping using locally-generated summary information, for rendering HDR content. A playback system such as the video playback system (401, 402, 403) shown in FIGS. 4a-4c, or other playback system, can perform the technique (1100).

The playback system produces (1110) sample values of a picture of HDR content. For example, a video decoder of the playback system decodes encoded data for the picture of HDR content, thereby producing the sample values. Or, a game console produces the sample values when rendering HDR content for a game. Or, the sample values are produced in some other way.

In any case, from the sample values of the picture of HDR content, the playback system generates (1120) summary information for the sample values of the picture of HDR content. For example, the summary information is histogram information organized as described in section V. Alternatively, the playback system generates some other type of summary information. Depending on implementation, a video decoder or other module (such as a 2D DSP, 3D DSP, or software module executing on a CPU) can compute the summary information from the sample values of the picture of HDR content.

The playback system sets (1130) a tone mapping function based at least in part on the summary information for the sample values of the picture of HDR content. In setting (1130) the tone mapping function, the playback system can also consider other information such as the peak brightness of a target display device and an indication of ambient light in an environment around the target display device. The tone mapping function can be set in various ways.

For example, to set the tone mapping function, the playback system selects a highest bin, among the multiple bins of histogram information, that satisfies a threshold count of the sample values of the picture of HDR content. (Depending on implementation, the count of sample values for the current bin can satisfy the threshold count if it is greater than the threshold count, or if it is greater than or equal to the threshold count.) The threshold count depends on implementation and can have a value as described in section VI. Alternatively, the playback system selects a highest bin, among the bins of the histogram information, that has at least one sample value of the picture of HDR content. The playback system sets a maximum point of the tone mapping function based at least in part on the selected bin. For example, the playback system sets the maximum point of the tone mapping function based on the maximum possible sample value for the selected bin. Or, the playback system sets the maximum point of the tone mapping function based on the actual maximum sample value in the selected bin.

As another example, FIG. 12a shows a technique (1201) for setting a tone mapping function based on histogram information or other summary information for sample values of a picture of HDR content. The playback system selects (1210) the tone mapping function (e.g., an optimal or otherwise appropriate tone mapping function), from among multiple available tone mapping functions, based at least in part on the summary information. The playback system also determines (1220) parameters for the selected tone mapping function, based at least in part on the summary information. Section VII.D describes examples of available tone mapping functions, their parameters, and how those parameters may be set depending on summary information. Alternatively, the available tone mapping functions include other and/or additional tone mapping functions.

As another example, FIG. 12b shows a more detailed technique (1202) for setting a tone mapping function based on summary information for sample values of a picture of HDR content. To start, from the summary information, the playback system determines (1230) the minimum sample value and the maximum sample value among the sample values of the picture of HDR content.

Next, the playback system checks (1240) whether to use a simplified tone mapping function. The playback system can use the simplified tone mapping function in various circumstances. For example, the playback system uses the simplified tone mapping function if a power-saving mode is active. (Using the simplified tone mapping function can save power since complex computations are avoided. Thus, the simplified tone mapping function can be selected if the playback system is in a power-saving mode). Or, as another example, the playback system uses the simplified tone mapping function if GPU-optimized mode is active. (In some example implementations, conditionals, branching, table lookup operations, complex computations, etc. are avoided with the simplified tone mapping function. As such, operations for the simplified tone mapping function can be efficiently implemented with shader instructions executable in shader units of a GPU for vector processing, e.g., with simple addition operations, simple scaling operations.) Or, as another example, the playback system uses the simplified tone mapping function if at least a threshold proportion of the sample values of the picture of HDR content are within a middle range of possible sample value, according to histogram information. The threshold proportion depends on implementation and can be, for example, 95%, 98%, 99%, 100%, or some other percent of the sample values of the picture of HDR content. The middle range is the range of sample values between a threshold for dark sample values (threshold dark sample value) and threshold for bright sample values (threshold bright sample value), which depend on implementation and can have values as described below. To simplify implementation, the threshold dark sample value or threshold bright sample value can be set at the boundary between two bins of the histogram information. Thus, with the simplified tone mapping function, if a picture of HDR content has few if any bright highlights (sample values above the threshold bright sample value) and few if any dark sample values (sample values below the threshold dark sample value), tone mapping operations can be simplified to reduce power consumption without hurting quality very much (e.g., due to clipping of bright sample values or dark sample values). In some cases, the simplified tone mapping function can also improve quality by enhancing the granularity of output values in the middle range of sample values.

If the simplified tone mapping function is to be used, the playback system selects (1242) the simplified tone mapping function. The simplified tone mapping function can be, for example, a variation of the simplified tone mapping function (1600) shown in FIG. 16 or other tone mapping function that uses only linear mapping operations. The playback system sets (1244) a minimum point, maximum point, and offset for the simplified tone mapping function. For example, the playback system sets the minimum point based on the minimum input value for the sample values of the picture of HDR content, and it sets the maximum point based on the maximum input value for the sample values of the picture and the brightness level of the target display device, which can be set as described in section VI. The offset can be set to a default boost amount or a boost amount that depends on ambient light level, content type, or another setting. If the brightness level of the target display device is reduced, input values to the tone mapping function can be scaled to compensate for the reduction in the brightness level. For example, if the brightness level is reduced by 50%, an input value can be doubled so that the output value, in effect, represents the same intensity or brightness.

Otherwise (the simplified tone mapping function is not to be used), the playback system checks (1250) whether to use a dark-only-range tone mapping function. The playback system can use the dark-only-range tone mapping function in various circumstances. For example, the playback system checks whether the maximum sample value for the picture satisfies a threshold for dark sample values (threshold dark sample value). (Depending on implementation, the maximum sample value can satisfy the threshold dark sample value if it is less than the threshold dark sample value, or if it is less than or equal to the threshold dark sample value.) Or, according to histogram information, the playback system checks whether at least a threshold proportion of the sample values of the picture of HDR content satisfy the threshold dark sample value (depending on implementation, are less than the threshold dark sample value, or less than or equal to the threshold dark sample value). The threshold proportion depends on implementation and can be, for example, 95%, 98%, 99%, 100%, or some other percent of the sample values of the picture of HDR content. The threshold dark sample value depends on implementation and can be, for example, an absolute value such as 1, 2, 4, 8, or 16, or a relative value such as 0.5%, 1%, or 2% of the maximum possible sample value. To simplify implementation, the threshold dark sample value can be set at a boundary between two bins of the histogram information.

If the dark-only-range tone mapping function is to be used, the playback system selects (1252) the dark-only-range tone mapping function. The dark-only-range tone mapping function can be, for example, a variation of the dark-only-range tone mapping function (1800) shown in FIG. 18 or other tone mapping function that covers only a range for dark sample values and uses a non-linear mapping. The playback system sets (1254) a minimum point and maximum point for the dark-only-range tone mapping function. For example, the playback system sets the minimum point based on the minimum input value for the sample values of the picture of HDR content, and it sets the maximum point based on the maximum input value for the sample values of the picture and the brightness level of the target display device, which can be set as described in section VI. If the brightness level of the target display device is reduced, using the dark-only-range tone mapping function can improve quality by enhancing the granularity of output values in the dark-only range, which can help mitigate banding artifacts between regions of uniform sample values.

Otherwise (the dark-only-range tone mapping function is not to be used), the playback system checks (1260) whether to use a dark-to-mid-range tone mapping function. The playback system can use the dark-to-mid-range tone mapping function in various circumstances. For example, the playback system checks whether the maximum sample value for the picture satisfies a threshold for bright sample values (threshold bright sample value). (Depending on implementation, the maximum sample value can satisfy the threshold bright sample value if it is less than the threshold bright sample value, or if it is less than or equal to the threshold bright sample value.) Or, using histogram information, the playback system checks whether at least a threshold proportion of the sample values of the picture of HDR content satisfy the threshold bright sample value (depending on implementation, are less than the threshold bright sample value, or less than or equal to the threshold bright sample value). The threshold proportion depends on implementation and can be, for example, 95%, 98%, 99%, 100%, or some other percent of the sample values of the picture of HDR content. The threshold bright sample value depends on implementation and can be, for example, an absolute value such as 128, 256, or 512, or a relative value such as 12.5%, 25%, or 50% of the maximum possible sample value. To simplify implementation, the threshold bright sample value can be set at a boundary between two bins of the histogram information.

If the dark-to-mid-range tone mapping function is to be used, the playback system selects (1262) the dark-to-mid-range tone mapping function. The dark-to-mid-range tone mapping function can be, for example, a variation of the dark-to-mid-range tone mapping function (1700) shown in FIG. 17 or other tone mapping function that covers a range for dark sample values and mid-range sample values. The playback system sets (1264) a minimum point, maximum point, offset, and switch point for the dark-to-mid-range tone mapping function. For example, the playback system sets the minimum point based on the minimum input value for the sample values of the picture of HDR content, and it sets the maximum point based on the maximum input value for the sample values of the picture and the brightness level of the target display device, which can be set as described in section VI. The offset can be set to a default boost amount or a boost amount that depends on ambient light level, content type, or another setting, which brightens dark sample values and mid-range sample values (since HDR video is often mastered for a dark viewing environment). The switch point indicates a transition between a non-linear mapping (for dark sample values) and linear mapping (for mid-range sample values). If the brightness level of the target display device is reduced, input values to the linear segment of the tone mapping function can be scaled to compensate for the reduction in the brightness level. Thus, if the brightest sample value among the sample values of the picture of HDR content is in the middle range, the playback system can omit tone mapping operations above that point, which can simplify implementation of the tone mapping function. Further, if the brightness level of the target display device is reduced, using the dark-to-mid-range tone mapping function can improve quality by enhancing the granularity of output values in the dark-to-mid range.

Otherwise (the dark-to-mid-range tone mapping function is not to be used), the playback system selects (1272) a default, generic tone mapping function. The generic tone mapping function can be, for example, a variation of the generic tone mapping function (1500) shown in FIG. 15 or other tone mapping function that covers a range of sample values from dark sample values through bright sample values. The playback system sets (1274) a minimum point, maximum point, offset, and switch points for the generic tone mapping function. For example, the playback system sets the minimum point based on the minimum input value for the sample values of the picture of HDR content, and it sets the maximum point based on the maximum input value for the sample values of the picture and the brightness level of the target display device, which can be set as described in section VI. The offset can be set to a default boost amount or a boost amount that depends on ambient light level, content type, or another setting, which brightens certain sample values. A first switch point indicates a transition between a non-linear mapping (for dark sample values) and linear mapping (for mid-range sample values). A second switch point indicates a transition between a linear mapping (for mid-range sample values) and a non-linear mapping (for bright sample values). If the brightness level of the target display device has been reduced, using the generic tone mapping function can improve quality by enhancing the granularity of output values.

B. Content-Adaptive Adjustment of Tone Mapping Functions Using Histogram Information.

FIG. 13 shows an example technique (1300) for content-adaptive adjustment of tone mapping functions using histogram information, for rendering HDR content. A playback system such as the video playback system (401, 402, 403) shown in FIGS. 4a-4c, or other playback system, can perform the technique (1300).

A module of the playback system receives (1310) histogram information for sample values of a picture of HDR content. For example, the histogram information is organized as described in section V. Alternatively, the histogram information is organized in some other way. Depending on implementation, the playback system can receive the histogram information from a metadata extractor, video decoder, or other module.

The playback system sets (1320) a tone mapping function based at least in part on the histogram information for the sample values of the picture of HDR content. In setting (1320) the tone mapping function, the playback system can also consider other information such as the peak brightness of a target display device and an indication of ambient light in an environment around the target display device. The tone mapping function can be set in various ways. For example, the playback system sets (1320) the tone mapping function as described in section VII.A with reference to operation (1130) of FIG. 11, potentially using one of the variations described with reference to FIG. 12a or FIG. 12b. Alternatively, the playback system sets (1320) the tone mapping function in some other way based at least in part on the histogram information.

C. Pairing Tone Mapping Functions With Pictures of HDR Content for Later Playback.

FIG. 14 shows an example technique (1400) for associating tone mapping functions with corresponding pictures of HDR content, for later playback of the pictures of HDR content. A playback system such as the video playback system (401, 402, 403) shown in FIGS. 4a-4c, or other playback system, can perform the technique (1400).

The playback system decodes (1410) encoded data for the picture of HDR content, thereby producing sample values of the picture of HDR content. The playback system generates (1420) summary information for the sample values of the picture of HDR content. For example, the summary information is histogram information organized as described in section V. Alternatively, the playback system generates some other type of summary information. Depending on implementation, a video decoder or other module (such as a 2D DSP, 3D DSP, or software module executing on a CPU) can compute the summary information from the sample values of the picture of HDR content. Or, a metadata extractor can parse metadata to generate the summary information.

The playback system sets (1430) a tone mapping function based at least in part on the summary information for the sample values of the picture of HDR content. In setting (1430) the tone mapping function, the playback system can also consider other information such as the peak brightness of a target display device and an indication of ambient light in an environment around the target display device. The tone mapping function can be set in various ways. For example, the playback system sets (1430) the tone mapping function as described in section VII.A with reference to operation (1130) of FIG. 11, potentially using one of the variations described with reference to FIG. 12a or FIG. 12b. Alternatively, the playback system sets (1430) the tone mapping function in some other way based at least in part on the summary information.

The playback system buffers (1440) parameters of the tone mapping function for later playback. The parameters of the tone mapping function are paired with the sample values of the picture of HDR content or with encoded data for the picture of HDR content. An indication of a brightness level that matches the tone mapping function can be buffered in association with the parameters of the tone mapping function.

The playback system checks (1450) whether to continue with the next picture in the video sequence. If so, the playback system decodes (1410) encoded data for the next picture of HDR content and generates (1420) summary information for the sample values of the next picture of HDR content. In this way, the playback system can buffer information about tone mapping functions for multiple pictures in a video sequence, for later playback on a target display device. The playback system can buffer such information in the context of video playback with selective deactivation of decoding resources (as described in section VIII), in the context of transcoding, or in some other context.

D. Example Tone Mapping Functions.

This section describes examples of tone mapping functions, their parameters, and how those parameters may be set depending on summary information (e.g., histogram information). A tone mapping function and its parameters can be selected to adapt the tone mapping function to the distribution of sample values reflected in the summary information.

Figure 15:
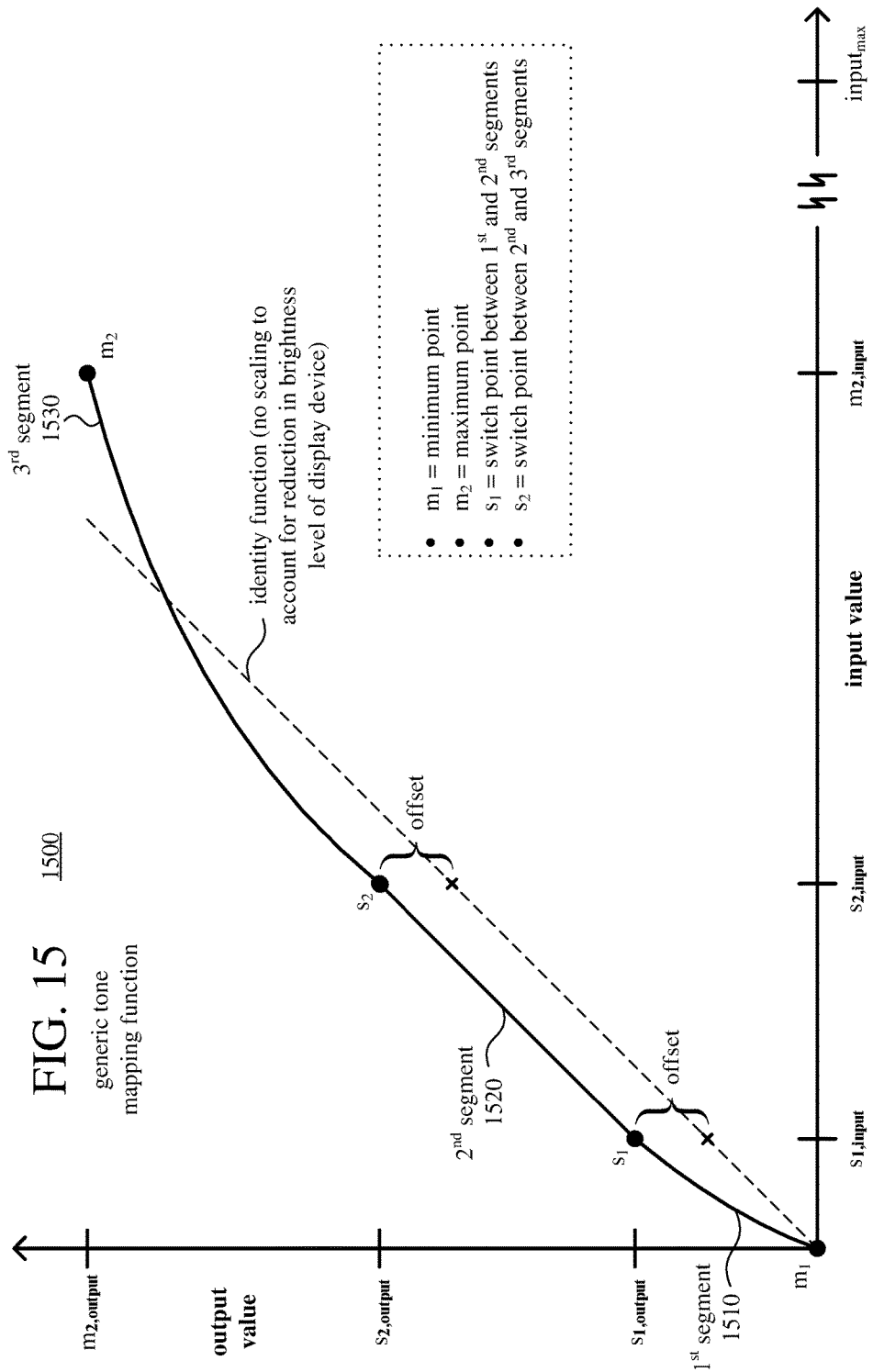
FIGS. 15-18 are diagrams illustrating example tone mapping functions, which can be used when rendering HDR content.

In each of the example tone mapping functions, one or more segments connect a minimum point $m_1$ to a maximum point $m_2$. The minimum point $m_1$ is set at the lowest input value ($m_{1,input}$) and lowest output value ($m_{1,output}$). In FIG. 15, the minimum point $m_1$ is 0, 0, but the minimum point $m_1$ can have another value (e.g., 32, 16 if the minimum input value is 32 and the lowest 16 output values are not valid). The maximum point $m_2$ is set at the highest input value ($m_{2,input}$) and highest output value ($m_{2,output}$), which is the peak brightness $disp_{max}$ after any reduction in brightness level. The peak brightness $disp_{max}$ depends on the type of display device (e.g., 100 nits for an SDR display device; 1000 nits or 1500 nits for an HDR display device). Thus, decision logic can set the maximum point $m_2$ based at least in part on a brightness level of a target display device and maximum input value for the sample values of a picture of HDR content.

Input values (along the horizontal axis) are mapped to corresponding output values (along the vertical axis) according to the tone mapping function. Any input values higher than the maximum input value $m_{2,input}$ can be clipped to the maximum output value $m_{2,output}$. Any input values lower than the minimum input value $m_{1,input}$ can be clipped to the minimum output value $m_{1,output}$. Tone mapping operations that follow a non-linear mapping tend to have a high computational cost and be sensitive to changes in the distribution of sample values. On the other hand, tone mapping operations that follow a linear mapping typically have a much lower computational cost, but may result in lower quality output values. Example tone mapping functions described in this section can include one or more segments of non-linear mapping and/or one or more segments of linear mapping.

Also, in addition to summary information, various types of feedback from the target display device (e.g., ambient light level, ambient light color) can be used for more fine-grained control over tone mapping. This can also help manage power usage (e.g., lowering overall brightness if ambient light level is low).

1. Example Generic Tone Mapping Function.

FIG. 15 shows an example generic tone mapping function (1500), which can be used when rendering HDR content. The generic tone mapping function (1500) includes three segments. The three segments collectively connect a minimum point $m_1$ to a maximum point $m_2$, which can be set as described at the beginning of section VII.D.

The first segment (1510) of the tone mapping function (1500) begins at the minimum point $m_1$ and ends at a first switch point $s_1$. Input values along the first segment (1510) are mapped to output values along the first segment (1510) according to a first non-linear mapping. In general, the input values for the first segment (1510) are dark sample values. In FIG. 15, the tone mapping function (1500) expands the range of the dark sample values. That is, for the first segment (1510), the difference between the highest input value (at the first switch point $s_1$) and lowest input value (at the minimum point $m_1$) is less than the difference between the highest output value (at the first switch point $s_1$) and lowest output value (at the minimum point $m_1$).

In FIG. 15, the first segment (1510) of the tone mapping function (1500) is configured such that the input values along the first segment (1510) are boosted according to the first non-linear mapping, while the range of the input values along the first segment (1510) is expanded. Thus, an input value is mapped to a brighter output value along the first segment (1510). Typically, HDR video is mastered for a dark viewing environment and a full range of brightness values. Boosting of the dark input values makes them more visible in brighter viewing environments. As explained below, the boost amount (dependent on the offset for the second segment (1520)) can be adjusted depending on ambient light level.

In some example implementations, the first non-linear mapping has a shape defined by a Bezier curve. In particular, the Bezier curve is a second-order rational Bezier curve parameterized by: (1) a first control point at the minimum point $m_1$; (2) a second control point, which is an intermediate point that controls the shape of the curve; (3) a third control point at the first switch point $s_1$; and (4) a weight. For the curve of the first segment (1510) shown in FIG. 15, the intermediate point is located halfway between (along the axis for output values) the minimum point $m_1$ and first switch point $s_1$, and located at this position minus the offset along the axis for input values. Alternatively, the intermediate control point for the first segment (1510) is located at some other position. The weight can be zero or have some other value derived by experiment. Alternatively, the first non-linear mapping (for the first segment (1510)) has a shape defined by some other variation of Bezier curve (e.g., a first-order Bezier curve; a third-order Bezier curve; a Bezier curve without adjustable weights associated with a rational Bezier curve) or by some other type of curve (e.g., a B-spline or other spline).

The second segment (1520) of the tone mapping function (1500) begins at the first switch point $s_1$ and ends at a second switch point $s_2$. Input values along the second segment (1520) are mapped to output values along the second segment (1520) according to a linear mapping. In general, the input values for the second segment (1520) are mid-range sample values. In FIG. 15, the second segment (1520) of the tone mapping function (1500) is configured such that the input values along the second segment (1520) are boosted by the offset (set as described below) according to the linear mapping. If the brightness level of the target display device is not reduced, the range of the input values is not compressed or expanded for the second segment (1520), but it is shifted by the amount of the offset. If the brightness level of the target display device is reduced, the range of the input values may be expanded for the second segment (1520) and shifted by the amount of the offset.

The third segment (1530) of the tone mapping function (1500) begins at the second switch point $s_2$ and ends at the maximum point $m_2$. Input values along the third segment (1530) are mapped to output values along the third segment (1530) according to a second non-linear mapping. In general, the input values for the third segment (1530) are bright sample values, e.g., representing bright highlights in HDR content, above the typical peak brightness for SDR content. In FIG. 15, the tone mapping function (1500) compresses the range of the bright sample values. That is, for the third segment (1530), the difference between the highest input value (at the maximum point $m_2$) and the lowest input value (at the second switch point $s_2$) is greater than the difference between the highest output value (at the maximum point $m_2$) and lowest output value (at the second switch point $s_2$). This compresses bright highlights while preserving some detail.

In FIG. 15, the third segment (1530) of the tone mapping function (1500) is configured such that at least some of the input values along the third segment (1530) are boosted according to the second non-linear mapping, while the range of the input values along the third segment (1530) is compressed. Along the third segment (1530), some (less bright) input values are boosted (increased) to brighter output values; other (brighter) input values are attenuated (decreased) to darker output values. Also, the "less bright" input values have more gradations in the output values than the "brighter" input values.

In some example implementations, the second non-linear mapping has a shape defined by a Bezier curve. In particular, the Bezier curve is a second-order rational Bezier curve parameterized by: (1) a first control point at the second switch point $s_2$; (2) a second control point, which is an intermediate point that controls the shape of the curve; (3) a third control point at the maximum point $m_2$; and (4) a weight. For the curve of the third segment (1530) shown in FIG. 15, the intermediate point is located halfway between (along the axis for output values) the second switch point $s_2$ and the maximum point $m_2$, and located at this position minus the offset along the axis for input values. Alternatively, the intermediate control point for the third segment (1530) is located in some other position. For the second non-linear mapping, the weight can be the ratio $m_{2,output}/m_{2,input}$, or it can have some other value derived by experiment. Alternatively, the second non-linear mapping (for the third segment (1530)) has a shape defined by some other variation of Bezier curve (e.g., a first-order Bezier curve; a third-order Bezier curve; a Bezier curve without adjustable weights associated with a rational Bezier curve) or by some other type of curve (e.g., a B-spline or other spline).

Decision logic can be configured to set the generic tone mapping function (1500) by setting various parameters, including the first switch point $s_1$, second switch point $s_2$, and offset. The first switch point $s_1$ separates the first segment (1510) and second segment (1520) of the generic tone mapping function (1500). The second switch point $s_2$, separates the second segment (1520) and third segment (1530) of the generic tone mapping function (1500). The offset indicates a boost amount for the second segment (1520). For reference, FIG. 15 shows a line (identity function) at which an output value equals the corresponding input value, after scaling to compensate for any reduction in the brightness level of the target display device. In the example tone mapping function (1500) of FIG. 15, no such scaling is performed.

Decision logic can set the first switch point $s_1$ based at least in part on the summary information. For example, the decision logic can set the first switch point $s_1$ based at least in part on the highest output value (for the brightness level of a target display device, considering the peak brightness of the target display device) and a first weight factor. In FIG. 15, the output value for the first switch point $s_{1,output}$ is set at the output value indicated by the weight factor $t_1$ times the highest output value $m_{2,output}$. The value of the weight factor $t_1$ depends on implementation. For example, weight factor $t_1$ is 0.15 or 0.2. At the first switch point $s_1$, the input value $s_{1,input}$ is the first weight factor times $m_{2,output}$, minus the offset: $(t_1 * m_{2,output})$–offset.

Decision logic can set the second switch point $s_2$ based at least in part on the summary information. For example, the decision logic can set the second switch point $s_2$ based at least in part on the highest output value $m_{2,output}$ (for the brightness level of a target display device, considering the peak brightness of the target display device) and a second weight factor, which is larger than the first weight factor (for the first switch point $s_1$). In FIG. 15, the output value for the second switch point $s_{2,output}$ is set at the output value indicated by the weight factor $t_2$ times the highest output value $m_{2,output}$. The value of the weight factor $t_2$ depends on implementation. For example, weight factor $t_2$ is 0.45 or 0.5. At the second switch point $s_2$, the input value $s_{2,input}$ is the second weight factor times $m_{2,output}$, minus the offset: $(t_2 * m_{2,output})$–offset.

As explained above, the switch points $s_1$ and $s_2$ can be set based on the highest output value $m_{2,output}$ and weight factors $t_1$ and $t_2$. The weight factors $t_1$ and $t_2$ can be pre-defined. Alternatively, by changing the weight factors $t_1$ and $t_2$, the switch points $s_1$ and $s_2$ can be set depending on the content of the sample values of HDR content (as indicated through analysis of histogram information or other, similarly detailed summary information). Or, by changing the weight factors $t_1$ and $t_2$, the switch points $s_1$ and $s_2$ can be set depending on the content type of the sample values of HDR content (e.g., game, sports, news, movie), as indicated through metadata, a user setting, etc. Changing the switch points $s_1$ and $s_2$ affects the sizes of the segments (1510, 1520, 1530) and overall mapping behavior (expansion range for dark sample values; compression range for brighter sample values). For example, for a given boost amount (offset), setting a lower switch point between the first segment (1510) and second segment (1520) results in a higher rate of range expansion for the darkest sample values. If HDR content include relatively many dark sample values (or preservation of details between dark sample values is favored for a content type), the switch point between the first segment (1510) and second segment (1520) can be lowered. For a given boost amount (offset), setting a higher switch point between the second segment (1520) and third segment (1530) results in a higher rate of range compression for the brightest sample values. If HDR content includes relatively few bright sample values (or preservation of details between bright sample values is not favored for a content type), the switch point between the second segment (1520) and third segment (1530) can be increased.

The offset can have a pre-defined value that does not depend on the peak brightness for a target display device or highest output value $m_{2,output}$. Or, decision logic can set the offset based at least in part on histogram information or other, similarly detailed summary information. For example, the decision logic can set the offset to a low value (such as 2 or 4) if a picture includes mostly mid-range sample values and/or bright sample values, or set the offset to a high value (such as 8 or 10) if a picture includes mostly dark sample values. The offset can also depend on an ambient light level for an environment around the target display device, content type of the sample values of the video, and/or another factor. For example, if the ambient light level is lower (viewing environment is darker), the boost amount is lower. On the other hand, if the ambient light level is higher (viewing environment is brighter), the boost amount is higher. The boost amount (offset) can also be adjusted depending on content type (e.g., game, sports, news, movie), as indicated through metadata, a user setting, etc. For example, the boost amount could be lower for "movie" or "news" content, and higher for "game" or "sports" content.

In some example implementations, decision logic includes a feedback loop that limits how much the switch points and offset can vary from picture-to-picture. For example, the switch points and offset are limited to change no more than 10%, 15%, or some other amount between successive pictures.

2. Example Simplified Tone Mapping Function.

Figure 16:
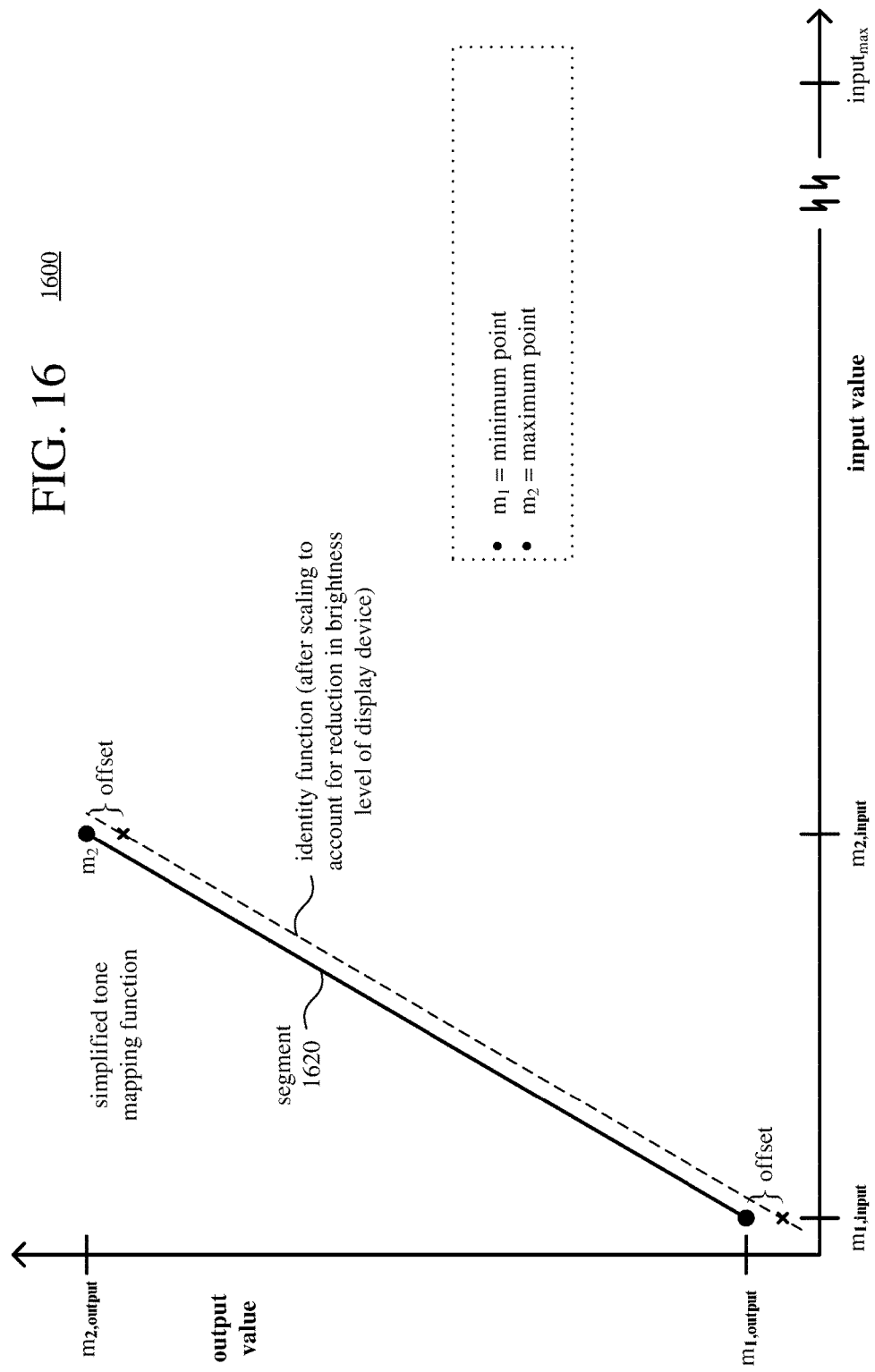

FIG. 16 shows an example simplified tone mapping function (1600), which can be used when rendering HDR content. The simplified tone mapping function (1600) includes a single segment (1620), which begins at a minimum point $m_1$ and ends at a maximum point $m_2$. The minimum point $m_1$ and maximum point $m_2$ can be set as described at the beginning of section VII.D. Input values along the single segment (1620) are mapped to output values along the single segment (1620) according to a linear mapping. Tone mapping operations for the simplified tone mapping function (1600) use simple operations such as scaling (multiplication) and addition, without conditional logic or complex computation, which can be efficiently implemented with shader instructions executable in a shader units of a GPU. The simplified tone mapping function (1600) can be selected in various circumstances, including when a power-saving mode is active, when a GPU-optimized mode is active, or when at least a threshold proportion of the sample values of a picture of HDR content are within a middle range of possible sample values.

In FIG. 16, the single segment (1620) of the tone mapping function (1600) is configured such that the input values along the single segment (1620) are boosted by the offset according to the linear mapping. If the brightness level of the target display device is not reduced, the range of the input values is not compressed or expanded for the single segment (1620), but it is shifted by the amount of the offset. If the brightness level of the target display device is reduced, the range of the input values may be expanded (due to scaling) for the single segment (1620) and shifted by the amount of the offset. Decision logic can be configured to set the simplified tone mapping function (1600) by setting one or more parameters, including an offset. The offset indicates a boost amount for the single segment (1620). FIG. 16 shows a line (identity function) at which an output value equals the corresponding input value, after scaling to compensate for any reduction in the brightness level of the target display device. The offset can have a pre-defined value that does not depend on the peak brightness for a target display device or highest output value $m_{2,output}$. Or, decision logic can set the offset based at least in part on the summary information, an ambient light level for an environment around the target display device, content type of the sample values of the video, and/or another factor, as described in section VII.D.1. In some example implementations, decision logic includes a feedback loop that limits how much the offset can vary from picture-to-picture. For example, the offset is limited to change no more than 10%, 15%, or some other amount between successive pictures.

3. Example Dark-to-Mid-Range Tone Mapping Function.

Figure 17:
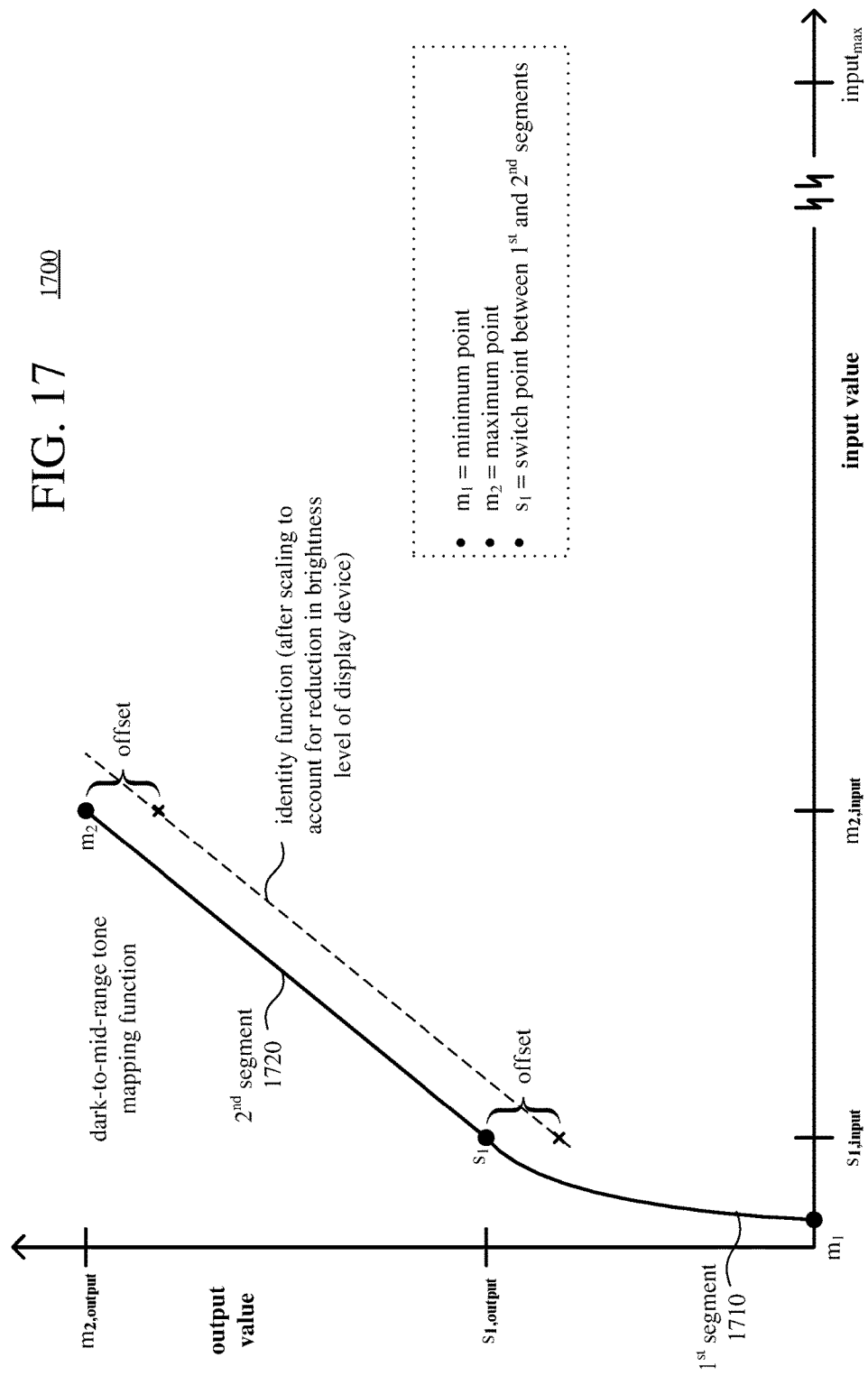

FIG. 17 shows an example dark-to-mid-range tone mapping function (1700), which can be used when rendering HDR content. The dark-to-mid-range tone mapping function (1700) includes two segments, which collectively connect a minimum point $m_1$ to a maximum point $m_2$. The minimum point $m_1$ and maximum point $m_2$ can be set as described at the beginning of section VII.D. The dark-to-mid-range tone mapping function (1700) can be selected in various circumstances, including when a threshold proportion of sample values of a picture of HDR content satisfies a threshold for bright sample values (threshold bright sample value), or when a maximum sample value (among the sample values of the picture of HDR content) is satisfies the threshold bright sample value but not a threshold for dark sample values (threshold dark sample value). The dark-to-mid-range tone mapping function (1700) lacks a segment of a non-linear mapping for bright highlights. When summary information indicates a picture of HDR content lacks bright highlights, using the dark-to-mid-range tone mapping function can simplify implementation and allow the range of output values to be focused around the dark sample values and mid-range sample values.

The first segment (1710) of the dark-to-mid-range tone mapping function (1700) begins at the minimum point $m_1$ and ends at a switch point $s_1$. Input values along the first segment (1710) are mapped to output values along the first segment (1710) according to a non-linear mapping. In general, the input values for the first segment (1710) are dark sample values. In FIG. 17, the first segment (1710) of the dark-to-mid-range tone mapping function (1700) is configured such that the input values along the first segment (1710) are boosted according to the non-linear mapping, while the range of the input values along the first segment (1710) is expanded. Thus, an input value is mapped to a brighter output value along the first segment (1710). Boosting of the dark input values makes them more visible in brighter viewing environments. As explained below, the boost amount (dependent on the offset for the second segment (1720)) can be adjusted depending on ambient light level.

In some example implementations, the non-linear mapping for the first segment (1710) has a shape defined by a Bezier curve. In particular, the Bezier curve can be a second-order rational Bezier curve parameterized as described with reference to the first segment (1510) of the generic tone mapping function (1500) of FIG. 15. Alternatively, the non-linear mapping (for the first segment (1710)) has a shape defined by some other variation of Bezier curve (e.g., a first-order Bezier curve; a third-order Bezier curve; a Bezier curve without adjustable weights associated with a rational Bezier curve) or by some other type of curve (e.g., a B-spline or other spline).

The second segment (1720) of the dark-to-mid-range tone mapping function (1700) begins at the switch point $s_1$ and ends at the maximum point $m_2$. Input values along the second segment (1720) are mapped to output values along the second segment (1720) according to a linear mapping. In general, the input values for the second segment (1720) are mid-range sample values. In FIG. 17, the second segment (1720) of the dark-to-mid-range tone mapping function (1700) is configured such that the input values along the second segment (1720) are boosted by the offset according to the linear mapping. If the brightness level of the target display device is not reduced, the range of the input values is not compressed or expanded for the second segment (1720), but it is shifted by the amount of the offset. If the brightness level of the target display device is reduced, the range of the input values may be expanded for the second segment (1720) and shifted by the amount of the offset.

Decision logic can be configured to set the dark-to-mid-range tone mapping function (1700) by setting various parameters, including a switch point $s_1$ and an offset. The switch point $s_1$ separates a first segment (1710) and second segment (1720) of the dark-to-mid-range tone mapping function (1700). The offset indicates a boost amount for the second segment (1720). For reference, FIG. 17 shows a line (identity function) at which an output value equals the corresponding input value, after scaling to compensate for any reduction in the brightness level of the target display device.

Decision logic can set the switch point $s_1$ based at least in part on the summary information. Specifically, as explained in section VII.D.1, the switch point $s_1$ can be set based on the highest output value $m_{2,output}$ and weight factor $t_1$. Or, for the dark-to-mid-range tone mapping function (1700), the weight factor $t_1$ can have a higher value such as 0.3 or 0.4, since there are no bright sample values. The weight factor $t_1$ can be pre-defined. Alternatively, by changing the weight factor $t_1$, the switch point $s_1$ can be set depending on the content of the sample values of HDR content (as indicated through analysis of histogram information or other, similarly detailed summary information). Or, by changing the weight factor $t_1$, the switch point $s_1$ can be set depending on the content type of the sample values of HDR content (e.g., game, sports, news, movie), as indicated through metadata, a user setting, etc. Changing the switch point $s_1$ affects the sizes of the segments (1710, 1720) and overall mapping behavior (expansion range for dark sample values). For example, for a given boost amount (offset), setting a lower switch point between the first segment (1710) and second segment (1720) results a higher rate of range expansion for the darkest sample values. If HDR content include relatively many dark sample values (or preservation of details between dark sample values is favored for a content type), the switch point between the first segment (1710) and second segment (1720) can be lowered.

The offset can have a pre-defined value that does not depend on the peak brightness for a target display device or highest output value $m_{2,output}$. Or, decision logic can set the offset based at least in part on the summary information, an ambient light level for an environment around the target display device, content type of the sample values of the video, and/or another factor, as described in section VII.D.1.

In some example implementations, decision logic includes a feedback loop that limits how much the switch point and offset can vary from picture-to-picture. For example, the switch point and offset are limited to change no more than 10%, 15%, or some other amount between successive pictures.

4. Example Dark-Only-Range Tone Mapping Function.

Figure 18:
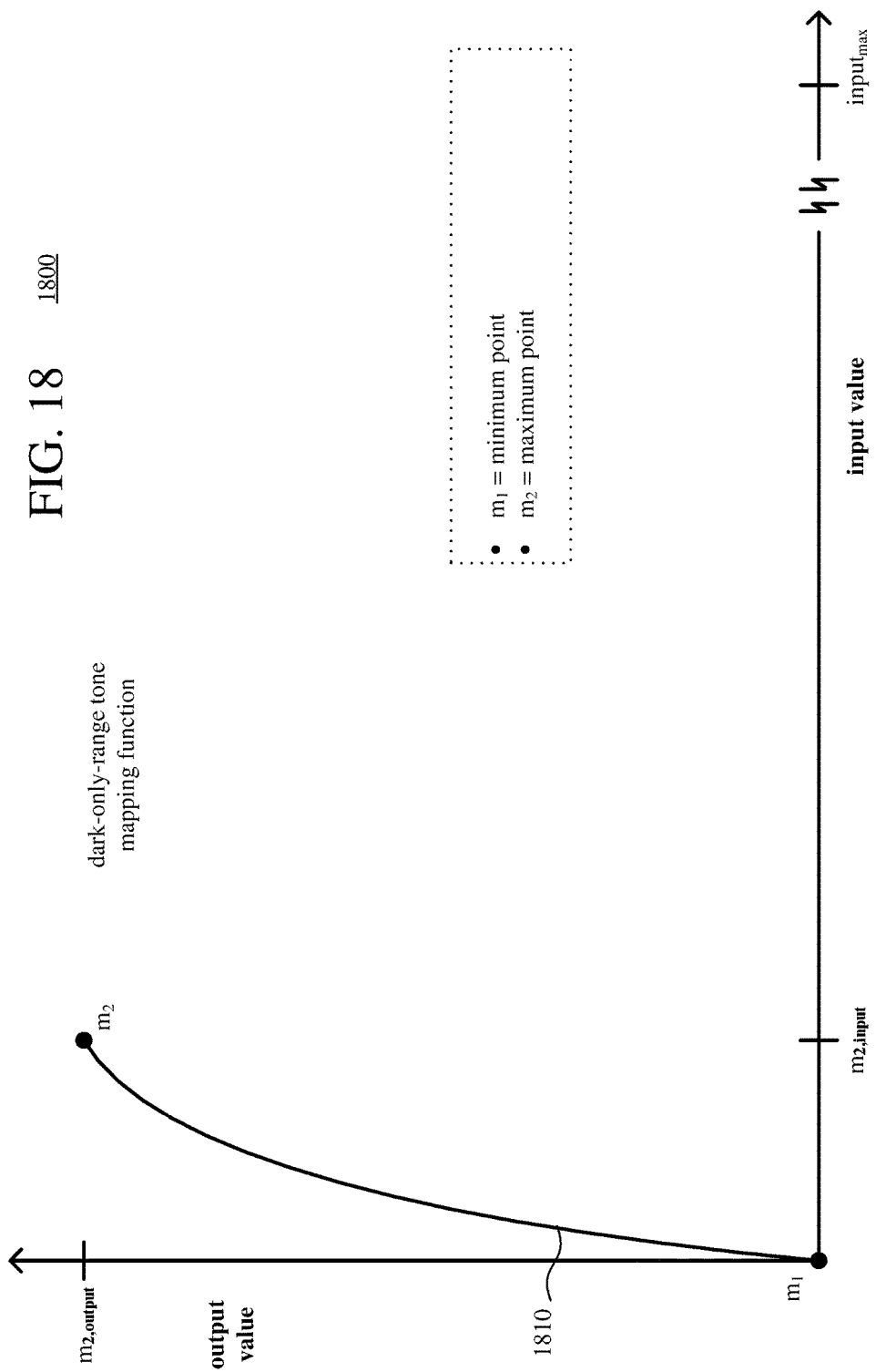

FIG. 18 shows an example dark-only-range tone mapping function (1800), which can be used when rendering HDR content. The dark-only-range tone mapping function (1800) includes a single segment, which connects a minimum point $m_1$ to a maximum point $m_2$. The minimum point $m_1$ and maximum point $m_2$ can be set as described at the beginning of section VII.D. The dark-only-range tone mapping function (1800) can be selected in various circumstances, including when a threshold proportion of sample values of a picture of HDR content satisfies a threshold for dark sample values (threshold dark sample value), or when a maximum sample value (among the sample values of the picture of HDR content) satisfies the threshold dark sample value. When a picture of HDR content includes only dark sample values (or predominantly includes dark sample values), using the dark-only-range tone mapping function (1800) allows the range of output values to be focused around the dark sample values.

The single segment (1810) of the dark-only-range tone mapping function (1800) begins at the minimum point $m_1$ and ends at the maximum point $m_2$. Input values along the segment (1810) are mapped to output values along the first segment (1810) according to a non-linear mapping. In general, the input values for the first segment (1810) are dark sample values. In FIG. 18, the segment (1810) of the dark-only-range tone mapping function (1800) is configured such that the input values along the first segment (1810) are boosted according to the non-linear mapping, while the range of the input values along the segment (1810) is expanded. Thus, an input value is mapped to a brighter output value along the segment (1810), which makes dark sample values more visible in brighter viewing environments.

In some example implementations, the non-linear mapping for the segment (1810) has a shape defined by a Bezier curve. In particular, the Bezier curve can be a second-order rational Bezier curve parameterized as described with reference to the first segment (1510) of the generic tone mapping function (1500) of FIG. 15. Alternatively, the non-linear mapping (for the segment (1810)) has a shape defined by some other variation of Bezier curve (e.g., a first-order Bezier curve; a third-order Bezier curve; a Bezier curve without adjustable weights associated with a rational Bezier curve) or by some other type of curve (e.g., a B-spline or other spline).

5. Other Example Tone Mapping Functions.

The available tone mapping functions can include other and/or additional tone mapping functions. For example, a tone mapping function can include an extra long segment with a non-linear mapping for bright highlights. Such a tone mapping function can be considered a special case of the generic tone mapping function (1500), which is selected if there are many bright highlights in a picture of HDR content. Or, as another example, a tone mapping function can include a segment with a linear mapping for mid-range sample values and a segment with a non-linear mapping for bright sample values, but lack a segment for dark sample values.

VIII. Examples of Selective Deactivation of Decoding Resources.

This section describes examples of selective deactivation of decoding resources. By selectively deactivating decoding resources, a video playback system can reduce power consumption.

Figure 19:
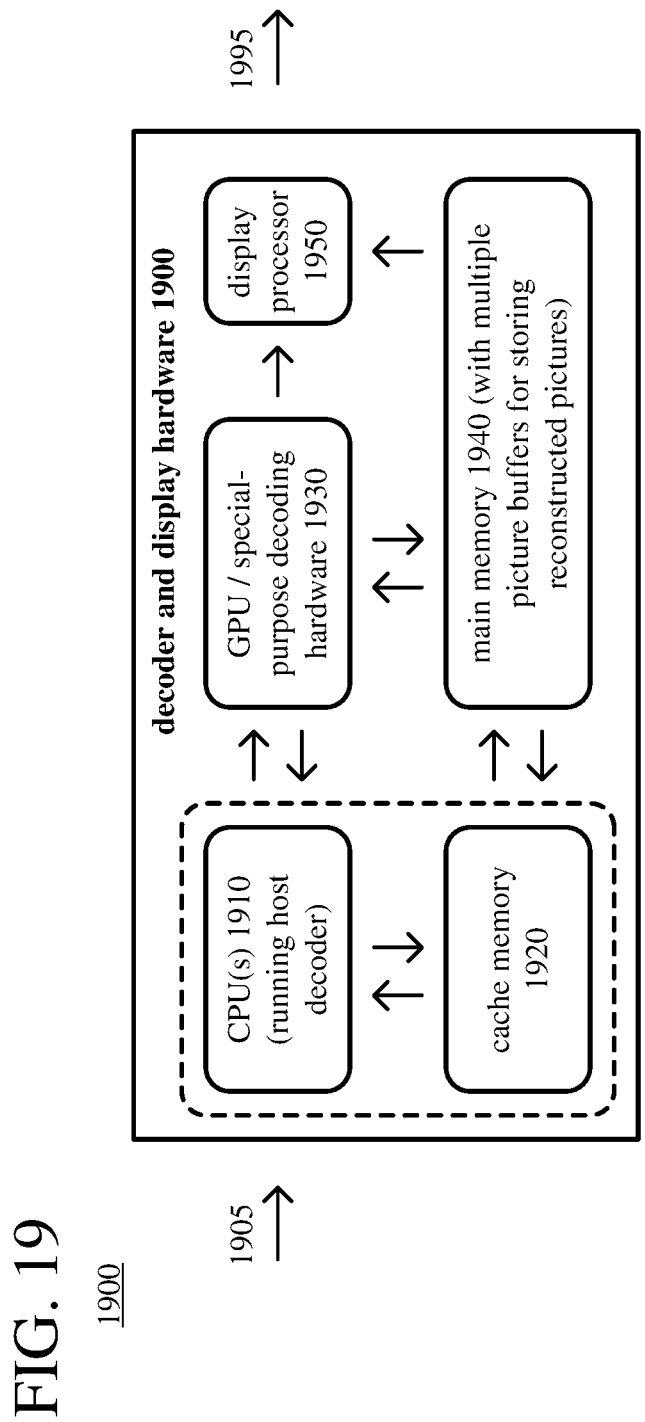
FIG. 19 is a diagram illustrating an example architecture for video decoding and display processing, in which one or more CPUs as well as a GPU and/or special-purpose decoding hardware are selectively deactivated between periods of activity.

FIG. 19 shows an example architecture (1900) for video decoding and display processing, in which one or more CPUs as well as a GPU and/or special-purpose decoding hardware are selectively deactivated between periods of activity. The example architecture (1900) can be used to perform video decoding and display processing when playing back HDR video with content-adaptive adjustment of the brightness level of a target display device and/or content-adaptive adjustment of a tone mapping function. Or, the example architecture (1900) can be used in other scenarios.

The example architecture (1900) includes one or more CPUs (1910), which run a host decoder and access cache memory (1920) associated with the CPU(s) (e.g., SRAM caches). The example architecture (1900) also includes a GPU and/or special-purpose decoding hardware (1930), which can be configured to perform decoding operations for entropy decoding, inverse quantization and inverse frequency transforms, motion compensation, deblock filtering, and/or other stages of decoding. The host decoder is configured to manage decoding operations of the GPU/special-purpose decoding hardware (1930). In addition, running on the CPU(s) (1910), the host decoder can be configured to perform some bitstream parsing operations (e.g., for high-level parameters) on encoded data (1905), entropy decoding operations, and/or other decoding operations.

In the example architecture (1900), the main memory (1940) includes multiple picture buffers, which are configured to store reconstructed pictures. The host decoder running on the CPU(s) (1910) and the GPU/decoding hardware (1930) store reconstructed pictures in the picture buffers and may access the reconstructed pictures (e.g., for motion compensation operations).

The example architecture (1900) also includes a display processor (1950) (e.g., DSP), which is configured to perform operations on reconstructed pictures before display. For example, the display processor (1950) is configured to perform color conversion operations, tone mapping operations, and other operations as part of rendering, producing sample values (1995) for output to a target display device.

In typical playback scenarios, the CPU(s) (1910) and cache memory (1920) consume a significant amount of power. At the same time, the CPU(s) (1910) and GPU/decoding hardware (1930) can perform decoding operations very quickly. The host decoder running on the CPU(s) (1910) and the GPU/decoding hardware (1930) can decode a batch of pictures and store the reconstructed pictures in picture buffers in main memory (1940). At that point, the CPU(s) (1910), cache memory (1920), and GPU/decision hardware (1930) can be deactivated temporarily in order to reduce overall power consumption. For example, in 100-200 milliseconds, the CPU(s) (1910) and GPU/decoding hardware (1930) reconstruct a batch of pictures for 1-2 seconds of video and store the reconstructed pictures in picture buffers in main memory (1940). The CPU(s) (1910), cache memory (1920), and GPU/decoding hardware (1930) are then deactivated until reactivation to reconstruct the next batch of pictures.

The display processor (1950) remains active and processes the reconstructed pictures in the picture buffers in main memory (1940), on a picture-by-picture basis, for output on a target display device. At an appropriate time depending on the frame rate of the video (e.g., every 1/30 second for video rendered at 30 frames per second, or every 1/60 second for video rendered at 60 frames per second), the display processor (1950) retrieves a reconstructed picture from a picture buffer in main memory (1940) and performs operations (e.g., for color conversion, tone mapping) to render the picture for output to a display device.

If the example architecture (1900) is used to perform video decoding and display processing when HDR video is played back with content-adaptive adjustment of the brightness level of a target display device (see section VI) and/or content-adaptive adjustment of a tone mapping function (see section VII), summary information for the respective reconstructed pictures can be stored in main memory (1940). In this case, when a reconstructed picture is to be rendered, decision logic (implemented with the display processor (1950) or otherwise) can retrieve the appropriate summary information (for the reconstructed picture) from main memory (1940) and make decisions about rendering the reconstructed picture using the summary information, as described in sections VI and VII. Alternatively, decision logic (implemented with the display processor (1950) or otherwise) can make decisions (as described in sections VI and VII) about how to render a reconstructed picture using summary information right after the picture is reconstructed with the CPU(s) (1910) and GPU/decoding hardware (1930), then buffer the decisions in main memory (1940). When the reconstructed picture is to be rendered, the display processor (1950) can retrieve the appropriate decisions (e.g., brightness level and/or tone mapping function for the reconstructed picture) from main memory (1940) and render the reconstructed picture according to the decisions.

FIGS. 20 and 21 show example techniques (2000, 2100) for video decoding and display processing, respectively, during which one or more CPUs as well as a GPU and/or special-purpose decoding hardware are selectively deactivated between periods of activity. A video playback system such as the video playback system (401, 402, 403) shown in FIGS. 4a-4c, or other video playback system, can perform the techniques (2000, 2100).

With reference to FIG. 20, the video playback system decodes (2010) a picture of video (e.g., HDR video) with a host decoder that runs on one or more CPUs and manages a GPU and/or special-purpose decoding hardware for some decoding operations. The video playback system buffers (2020) the reconstructed picture in main memory. If video is played back with content-adaptive adjustment of the brightness level of a target display device (see section VI) and/or content-adaptive adjustment of a tone mapping function (see section VII), summary information or decision information (e.g., brightness level and/or parameters of tone mapping function) for the reconstructed picture can be stored in main memory. The video playback system checks (2030) whether to continue decoding. If so, the video playback system continues by decoding (2010) the next picture of video. In this way, the video playback system can quickly decode a batch of pictures and buffer the reconstructed pictures in main memory. For example, the video playback system reconstructs 1-2 seconds of video in 100-200 milliseconds.

The video playback system can temporarily stop decoding ("no" branch at decision 2030) when a batch of pictures (having a threshold count of pictures) has been reconstructed or when some other criteria are satisfied. The video playback system deactivates (2040) the CPU(s) and GPU/decoding hardware. The deactivated components remain idle (2050) for an indefinite period of time. The video playback system checks (2060) whether to activate the CPU(s) and GPU/decoding hardware and, if so, activates (2070) the CPU(s) and GPU/decoding hardware to resume decoding operations. For example, the video playback system periodically checks whether a message has been received that indicates the CPU(s) and GPU/decoding hardware should be reactivated.

FIG. 21 shows a loop in which a video playback system performs rendering operations. Compared to the decoding loop shown in FIG. 20, the rendering loop shown in FIG. 21 is much slower. The video playback system waits (2110) for a next output time for a reconstructed picture. The appropriate output time depends on the frame rate of the video (e.g., every $\frac{1}{30}$ second for video rendered at 30 frames per second, or every $\frac{1}{60}$ second for video rendered at 60 frames per second). At the appropriate output time, the video playback system processes (2120) the next reconstructed pictures (in output order) in a picture buffer in main memory and outputs (2130) the picture. For example, with a display processor, the video playback system performs color conversion operations and tone mapping operations on sample values of the reconstructed picture. If video is played back with content-adaptive adjustment of the brightness level of a target display device (see section VI) and/or content-adaptive adjustment of a tone mapping function (see section VII), the display processor can retrieve summary information or decision information (e.g., brightness level and/or parameters of tone mapping function) for the reconstructed picture from main memory and use the retrieved information to adjust its operations. The video playback system checks (2140) whether a threshold count of pictures has been reached. The threshold count of pictures can be a count of reconstructed pictures remaining to be displayed in main memory. Or, the threshold count of pictures can be a count of reconstructed pictures rendered in a current batch. If the threshold count of pictures has not been reached, the video playback system waits (2110) for the output time for the next reconstructed picture. If the threshold count of pictures has been reached, the video playback system sends (2150) a message to awaken the CPU(s) and GPU/decoding hardware, thereby triggering resumption of decoding operations, and waits (2110) for the output time for the next reconstructed picture.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising one or more processing units and memory, wherein the computer system implements a playback system that is to be connected to a target display device having a brightness level that is dynamically controllable by the playback system, and wherein the playback system includes:
    decision logic implemented by software executable on one or more central processing units, among the one or more processing units, by software controlling special-purpose hardware, or by special-purpose hardware, wherein the decision logic is configured to:
        receive histogram information for sample values of a picture of high dynamic range ("HDR") content, wherein the histogram information for the sample values of the picture of HDR content is organized as multiple bins, each of the multiple bins having a count of the sample values of the picture of HDR content within that bin, and wherein each of the multiple bins represents a range of possible sample values between a minimum possible sample value for the bin and a maximum possible sample value for the bin;
        determine, based at least in part on the histogram information for the sample values of the picture of HDR content, a brightness level of the target display device for display of the picture of HDR content;
        set a tone mapping function to, at least in part, compensate for a change, if any, in the brightness level of the target display device by scaling at least some input values to the tone mapping function;

send, to the target display device, a control signal that indicates the brightness level of the target display device for display of the picture of HDR content; and after tone mapping, send, to the target display device, the sample values of the picture of HDR content; and a tone mapper configured to apply tone mapping to input values for the sample values of the picture of HDR content, according to the tone mapping function, and thereby produce output values for the sample values of the picture of HDR content.

2. The computer system of claim 1, wherein, to determine the brightness level of the target display device for display of the picture of HDR content, the decision logic is configured to:

select a highest bin, among the multiple bins, that satisfies a threshold count; and set the brightness level of the target display device based at least in part on the selected bin.

3. The computer system of claim 2, wherein the brightness level of the target display device for display of the picture of HDR content is also based at least in part on counts of sample values in one or more other bins, among the multiple bins, that are lower than the selected bin.

4. The computer system of claim 1, wherein the multiple bins have variable size in terms of range of possible sample values in the multiple bins, respectively.

5. The computer system of claim 4, wherein sizes of the multiple bins are perceptually weighted and define steps that are at least approximately uniform.

6. The computer system of claim 1, wherein the decision logic is further configured to buffer an indication of the brightness level of the target display device, and wherein the indication of the brightness level is paired with the sample values of the picture of HDR content and/or with encoded data for the picture of HDR content.

7. The computer system of claim 1, wherein the playback system further includes one of:

a metadata extractor configured to extract, from encoded data for the picture of HDR content, metadata indicating the histogram information and send the histogram information to the decision logic;

a digital signal processor or module configured to compute the histogram information from the sample values of the picture of HDR content and send the histogram information to the decision logic; and a video decoder configured to decode encoded data for the picture of HDR content, and thereby produce the sample values of the picture of HDR content, compute the histogram information from the sample values of the picture of HDR content, and send the histogram information to the decision logic.

8. In a computer system that implements a playback system connected to a target display device having a brightness level that is dynamically controllable by the playback system, a method comprising:

producing sample values of a picture of high dynamic range ("HDR") content;

generating, from the sample values of the picture of HDR content, histogram information for the sample values of the picture of HDR content, wherein the histogram information for the sample values of the picture of HDR content is organized as multiple bins, each of the multiple bins having a count of the sample values of the picture of HDR content within that bin, and wherein each of the multiple bins represents a range of possible sample values between a minimum possible sample value for the bin and a maximum possible sample value for the bin;

determining, based at least in part on the histogram information for the sample values of the picture of HDR content, a brightness level of the target display device for display of the picture of HDR content;

setting a tone mapping function to, at least in part, compensate for a change, if any, in the brightness level of the target display device by scaling at least some input values to the tone mapping function; and with a tone mapper, applying tone mapping to input values for the sample values of the picture of HDR content, according to the tone mapping function, thereby producing output values for the sample values of the picture of HDR content;

sending, to the target display device, a control signal that indicates the brightness level of the target display device for display of the picture of HDR content; and after the tone mapping, sending, to the target display device, the sample values of the picture of HDR content.

9. The method of claim 8, wherein the generating the histogram information includes one of:

with a video decoder, computing the histogram information from the sample values of the picture of HDR content; and with a digital signal processor or other module outside of the video decoder, computing the histogram information from the sample values of the picture of HDR content.

10. The method of claim 8, wherein:

the target display device has a single backlight, and the control signal indicates the brightness level of the single backlight of the target display device; or the target display device has multiple backlights, the histogram information is organized by regions that correspond to zones associated with the multiple backlights, respectively, and the control signal indicates the brightness level of one of the multiple backlights of the target display device.

11. The method of claim 8, further comprising:

buffering an indication of the brightness level of the target display device, wherein the indication of the brightness level is paired with the sample values of the picture of HDR content and/or with encoded data for the picture of HDR content.

12. The method of claim 8, wherein the target display device has a screen area, and wherein the method further comprises determining a proportion of the screen area that is used for rendering of the HDR content.

13. The method of claim 12, wherein, when a tile that includes only a portion less than all of the screen area is used for rendering of the HDR content, the method further comprises:

receiving histogram information for sample values of each of one or more other tiles of the screen area; and merging the histogram information for the sample values of the picture of HDR content and the histogram information for the sample values of each of the one or more other tiles of the screen area, wherein the brightness level of the target display device is also determined based at least in part on the histogram information for the one or more other tiles of the screen area.

14. One or more computer-readable media storing computer-executable instructions for causing a computer system, when programmed thereby, to perform operations, the computer system including a target display device having a brightness level that is dynamically controllable by the playback system, the operations comprising, for each of multiple pictures of high dynamic range ("HDR") content in a video sequence:

decoding encoded data for the picture of HDR content, thereby producing sample values of the picture of HDR content;

generating histogram information for the sample values of the picture of HDR content, wherein the histogram information for the sample values of the picture of HDR content is organized as multiple bins, each of the multiple bins having a count of the sample values of the picture of HDR content within that bin, and wherein each of the multiple bins represents a range of possible sample values between a minimum possible sample value for the bin and a maximum possible sample value for the bin;

determining, based at least in part on the histogram information for the sample values of the picture of HDR content, a brightness level of the target display device for display of the picture of HDR content;

setting a tone mapping function to, at least in part, compensate for a change, if any, in the brightness level of the target display device by scaling at least some input values to the tone mapping function;

with a tone mapper, applying tone mapping to input values for the sample values of the picture of HDR content, according to the tone mapping function, thereby producing output values for the sample values of the picture of HDR content;

sending, to the target display device, a control signal that indicates the brightness level of the target display device for display of the picture of HDR content; and after the tone mapping, sending, to the target display device, the sample values of the picture of HDR content.

15. The one or more computer-readable media of claim 14, wherein the generating the histogram information includes one of:

extracting, from the encoded data for the picture of HDR content, metadata indicating the histogram information;

with a video decoder, computing the histogram information from the sample values of the picture of HDR content; and with a digital signal processor or module outside the video decoder, computing the histogram information from the sample values of the picture of HDR content.

16. The method of claim 8, wherein the determining the brightness level of the target display device for the display of the picture of HDR content includes:

determining, from the histogram information, a maximum sample value among the sample values of the picture of HDR content; and based at least in part on the maximum sample value, setting the brightness level of the target display device for display of the picture of HDR content.

17. The method of claim 8, wherein the determining the brightness level of the target display device for display of the picture of HDR content includes:

selecting a highest bin, among the multiple bins, that satisfies a threshold count; and setting the brightness level of the target display device based at least in part on the selected bin.

18. The method of claim 8, wherein the multiple bins have variable size in terms of range of possible sample values in the multiple bins, respectively.

19. The method of claim 8, wherein sizes of the multiple bins are perceptually weighted and define steps that are at least approximately uniform.

20. The one or more computer-readable media of claim 14, wherein the multiple bins have variable size in terms of range of possible sample values in the multiple bins, respectively.

* * * * *